US012637148B2

(12) United States Patent　　(10) Patent No.: US 12,637,148 B2
Castiglione et al.　　(45) Date of Patent: May 26, 2026

(54) VEHICLE CARGO STORAGE APPARATUS

(71) Applicant: Rivian IP Holdings, LLC, Irvine, CA (US)

(72) Inventors: Micheal Richard Castiglione, Carlsbad, CA (US); Philipp Josef Wolf, Dana Point, CA (US); Neil Joseph Kwiatkowski, Costa Mesa, CA (US); Jonathan David Salerno, Newport, CA (US); Simon Baker, Basingstoke (GB); Shammika Ashan Wickramasinghe, Banbury (GB)

(73) Assignee: Rivian IP Holdings, LLC, Irvine, CA (US)

( * ) Notice: Subject to any disclaimer, the term of this patent is extended or adjusted under 35 U.S.C. 154(b) by 365 days.

(21) Appl. No.: 18/476,472

(22) Filed: Sep. 28, 2023

(65) Prior Publication Data

US 2025/0108866 A1　Apr. 3, 2025

(51) Int. Cl.
B62D 33/00　　(2006.01)
B62D 33/027　　(2006.01)

(52) U.S. Cl.
CPC ............................... B62D 33/0273 (2013.01)

(58) Field of Classification Search
CPC . B62D 33/0273; B62D 33/027; B62D 33/023
USPC .......................................................... 296/57.1
See application file for complete search history.

(56) References Cited

U.S. PATENT DOCUMENTS

| | | | |
|---|---|---|---|
| 6,422,630 B1 * | 7/2002 | Heaviside .......... | B62D 33/0273 |
| | | | 296/26.11 |
| 8,109,552 B2 * | 2/2012 | Nelson ............... | B62D 33/0273 |
| | | | 224/403 |
| 2002/0105201 A1 * | 8/2002 | Melotik .................. | B60R 5/041 |
| | | | 296/37.1 |
| 2018/0015962 A1 * | 1/2018 | Spahn ................ | B62D 33/0273 |
| 2022/0258810 A1 * | 8/2022 | Savard ............... | B62D 33/0273 |
| 2025/0002096 A1 * | 1/2025 | Johns ...................... | B60R 5/041 |

OTHER PUBLICATIONS

Steve Brown, "1937 Hudson Terraplane Utility Business Coupe," URL: https://www.flickr.com/photos/sjb4photos/36329881670, Aug. 22, 2017, retrieved from Internet Aug. 18, 2023.

* cited by examiner

*Primary Examiner* — Steven O Douglas
(74) *Attorney, Agent, or Firm* — Foley & Lardner LLP

(57) ABSTRACT
An apparatus can include a panel. The panel can couple with a tailgate of a vehicle. The panel can be configured to move from a first position relative to the tailgate to a second position to form a storage space. The storage space can be at least partially outside the vehicle.

20 Claims, 24 Drawing Sheets

2400

VEHICLE CARGO STORAGE APPARATUS

INTRODUCTION

A vehicle, such as an electric vehicle, can include a tailgate. The tailgate can open or close.

SUMMARY

At least one aspect is directed to an apparatus. The apparatus can include a panel to couple with a tailgate of a vehicle. The panel can be configured to move from a first position relative to the tailgate to a second position to form a storage space at least partially outside the vehicle.

At least one aspect is directed to a method. The method can include providing a panel. The method can include coupling the panel with a tailgate of a vehicle to move between a first position relative to the tailgate and a second position to form a storage space at least partially outside the vehicle.

At least one aspect is directed to an apparatus. The apparatus can include a storage compartment to couple with a vehicle including a tailgate. The apparatus can include a component to move the storage compartment from a first position at least partially within the vehicle to a second position at least partially outside the vehicle over the tailgate.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
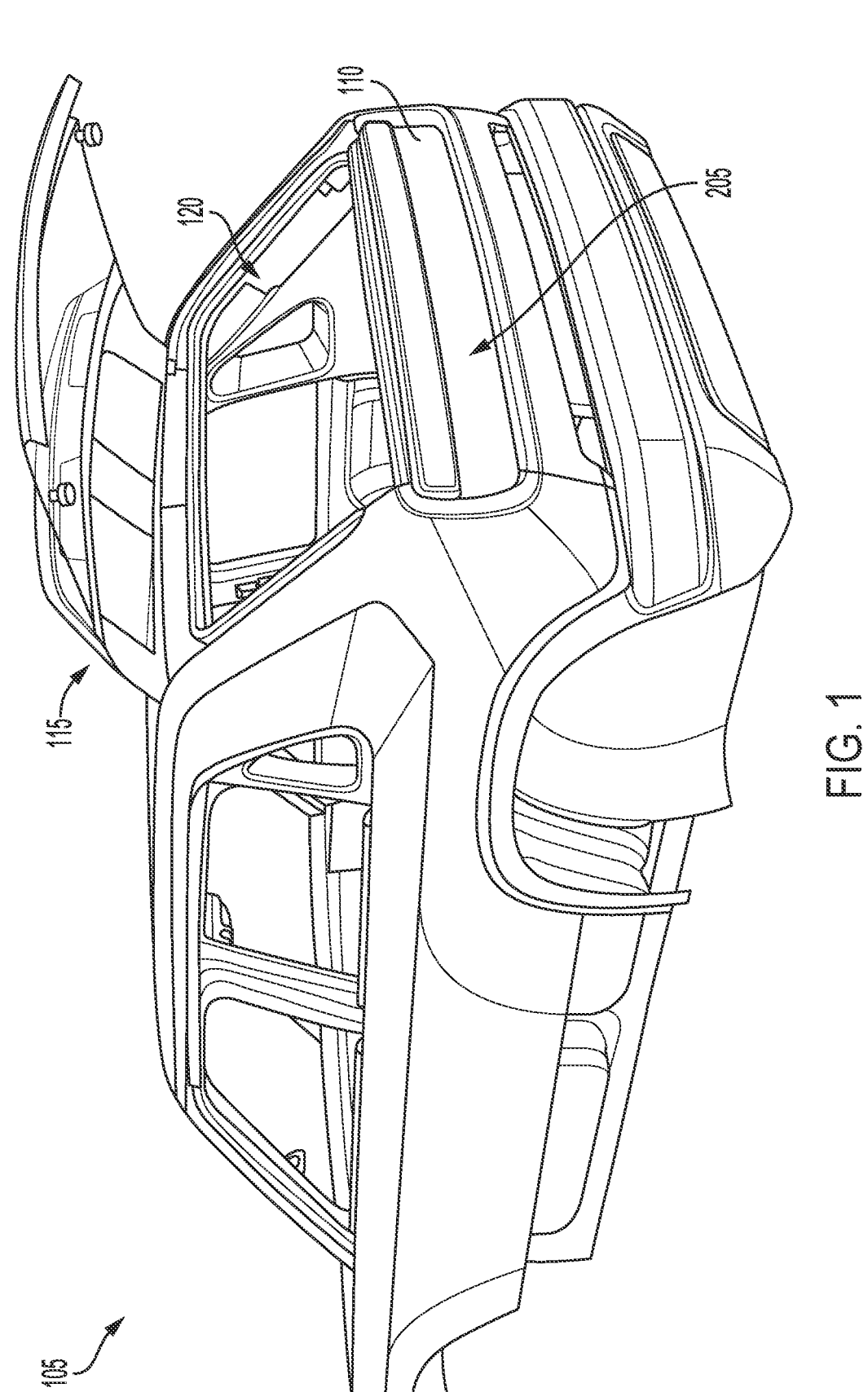
FIGS. 1-7 depicts an example vehicle including a storage apparatus that deploys from a tailgate of the vehicle.
Figure 2:
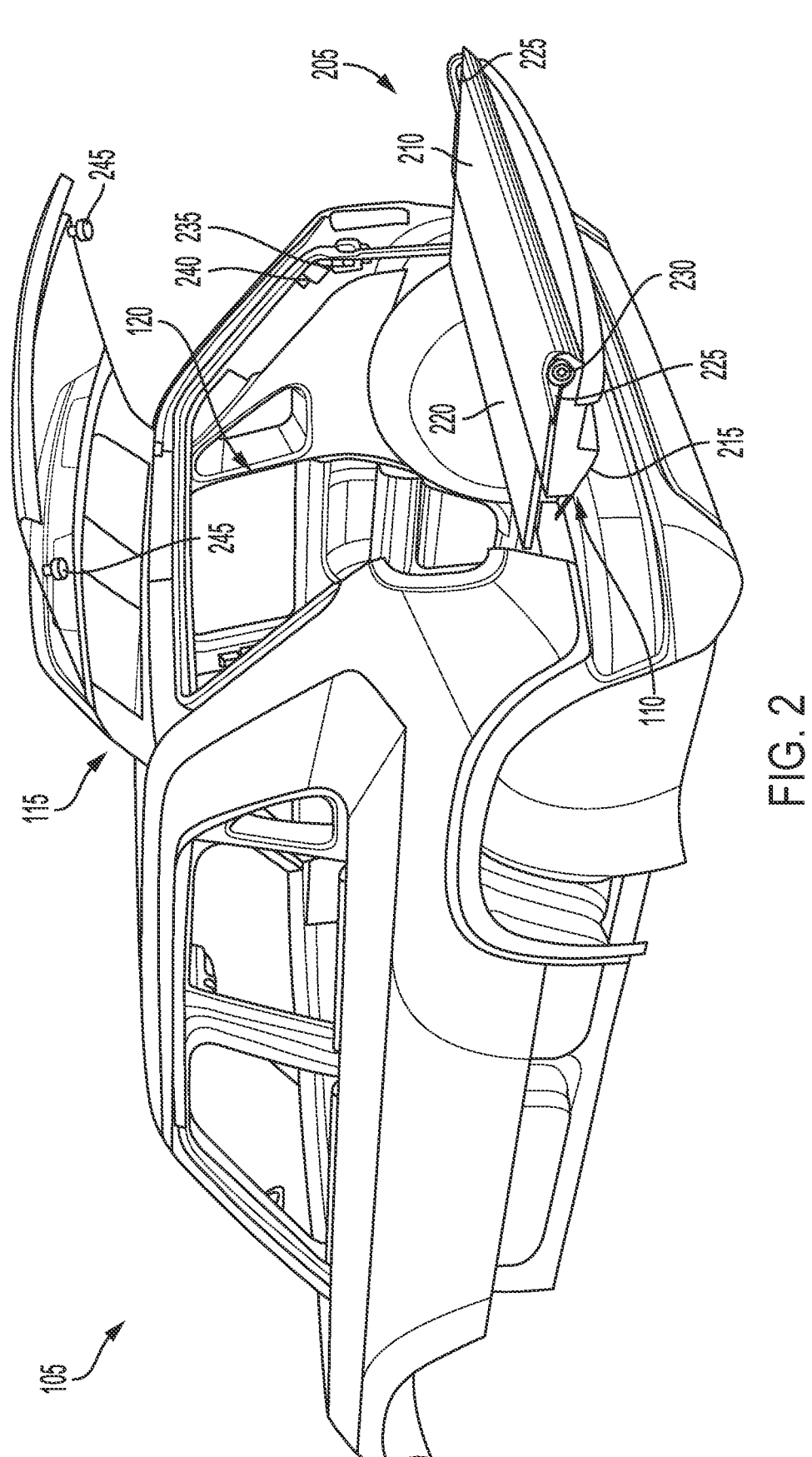
Figure 3:
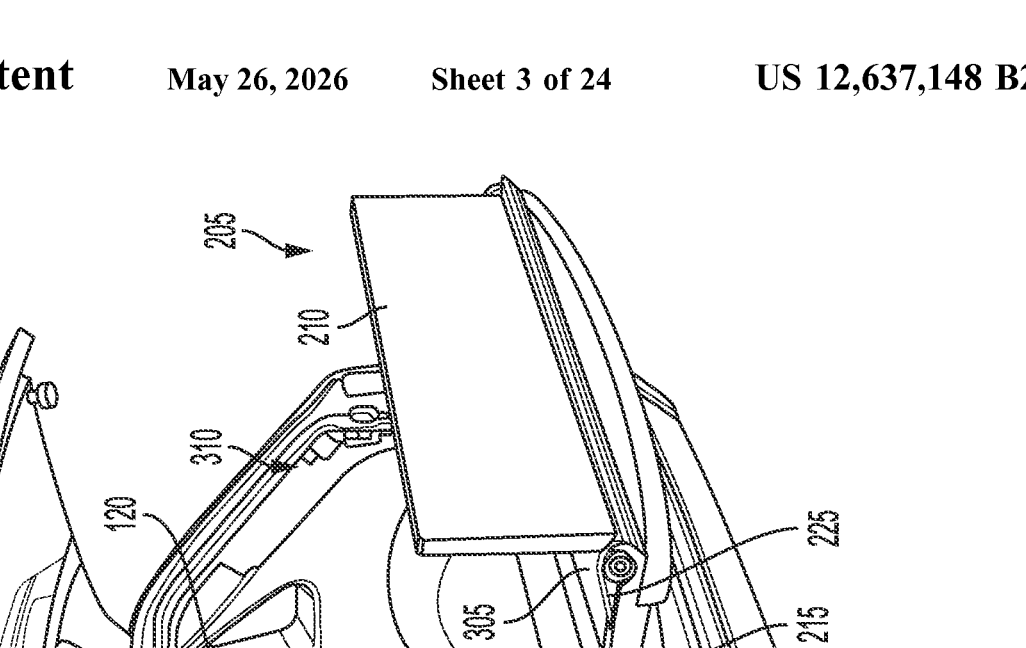
Figure 4:
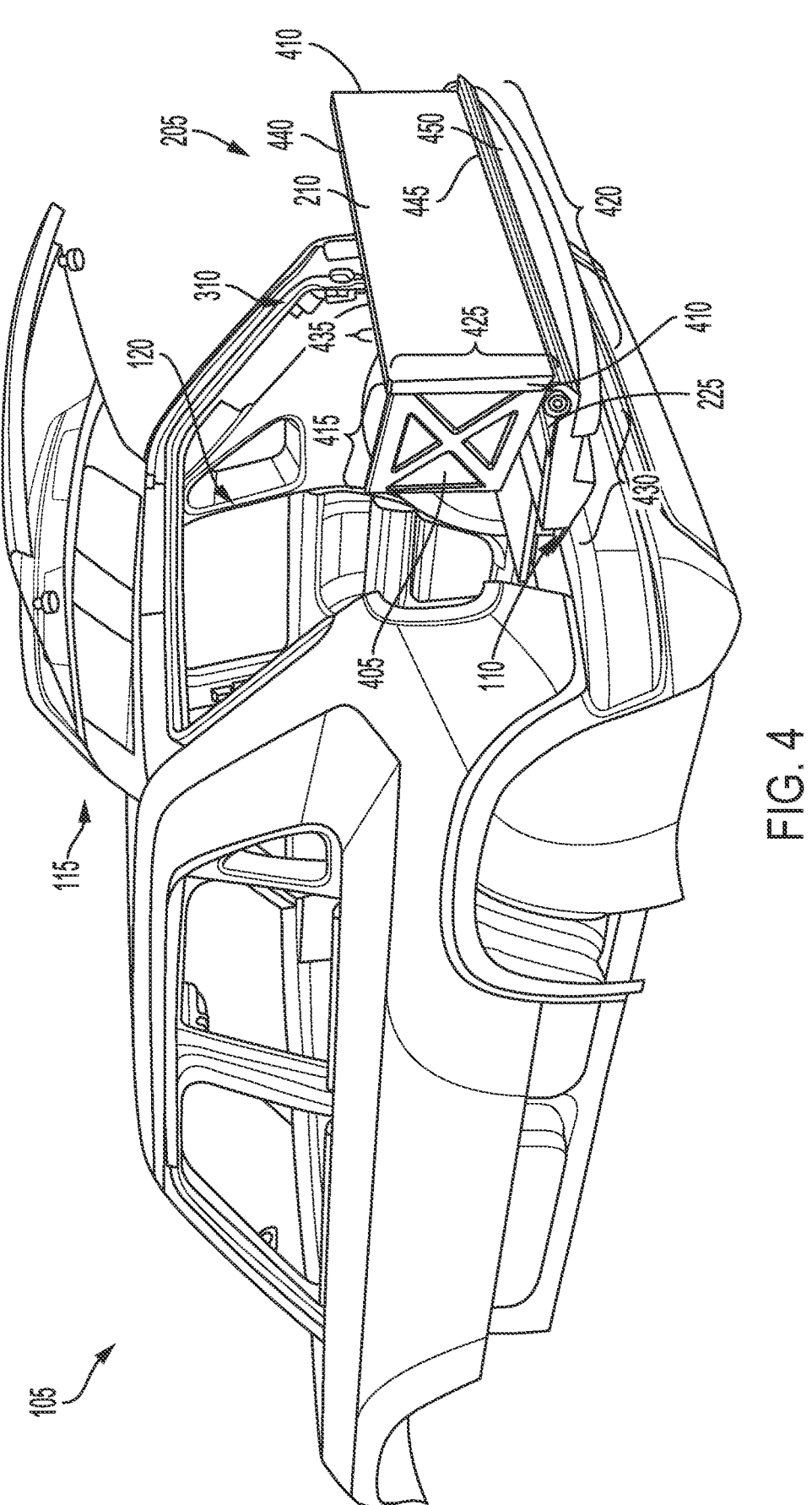
Figure 5:
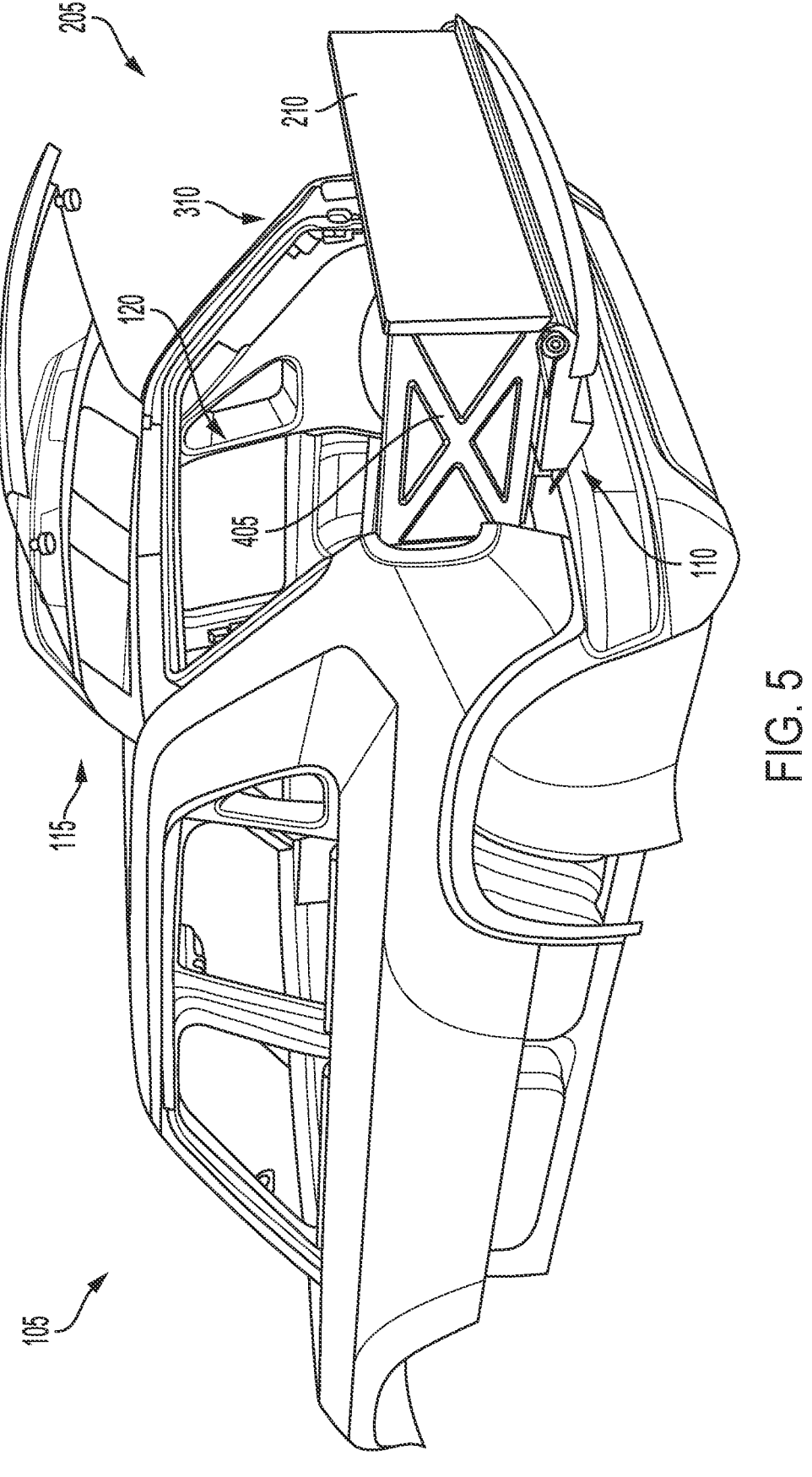
Figure 6:
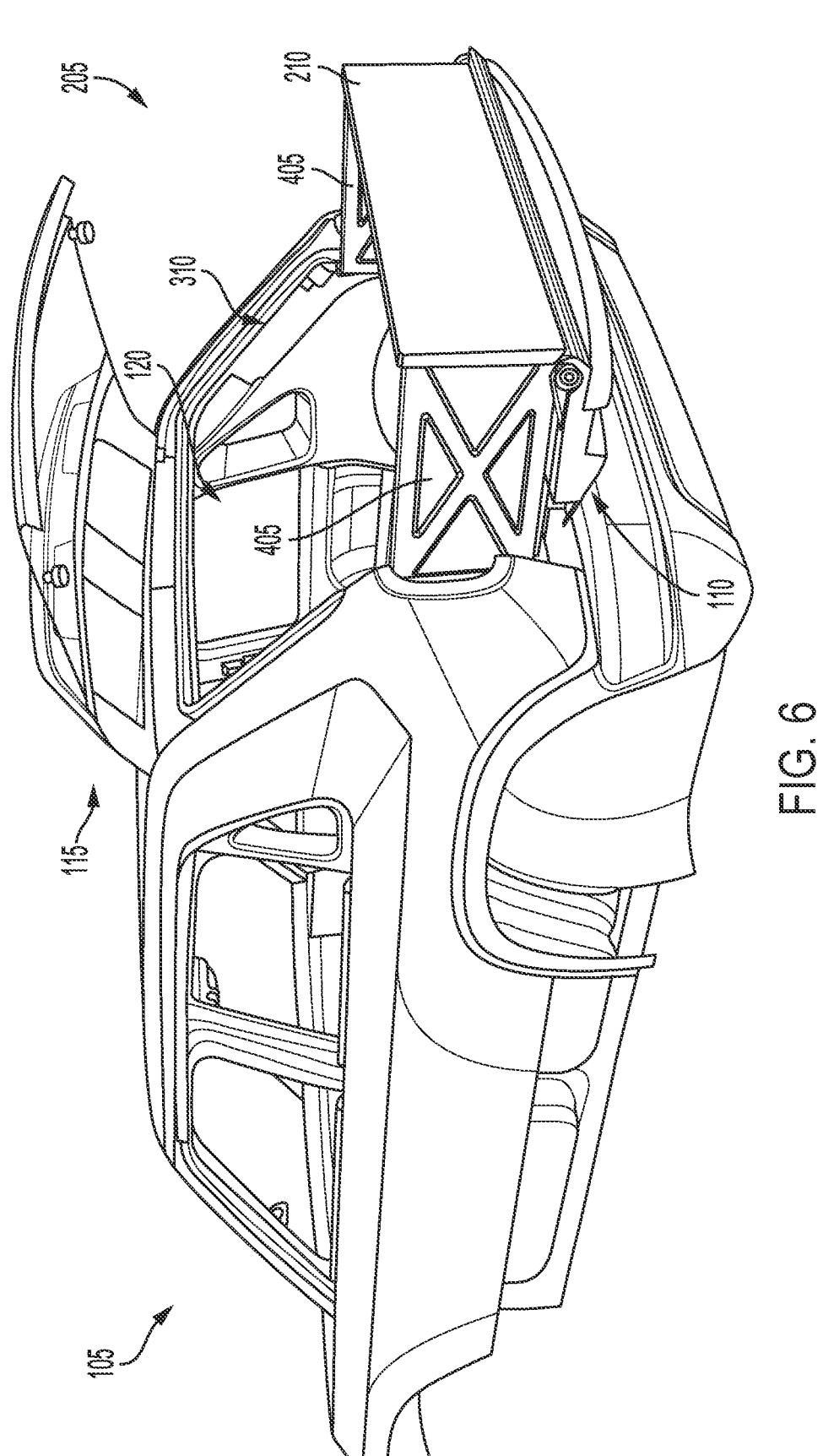

Following below are more detailed descriptions of various concepts related to, and implementations of, methods, apparatuses, and systems of a tailgate cargo storage apparatus. The various concepts introduced above and discussed in greater detail below may be implemented in any of numerous ways.

This disclosure is generally directed to techniques for cargo storage in a vehicle. In order to increase the cargo space of a vehicle, some vehicles can be designed with an increased trunk size. Furthermore, the vehicle can include various drawers, organizers, or other compartments disposed within the trunk to store cargo. However, a vehicle with an increased trunk size may need additional resources or materials to manufacture. Furthermore, such a vehicle can have increased weight due to the additional materials. Such a vehicle can also have decreased aerodynamics due to the additional size of the vehicle. This can cause the vehicle to have greater emissions, shorter vehicle range, or lower fuel efficiency. Furthermore, some pieces of cargo may be dirty, dusty, muddy, or wet, and storing these pieces of cargo within the trunk can cause the interior of the vehicle to become dirty or smelly.

To solve these and other technical problems, the present solution can include an apparatus that forms a storage space at least partially outside of the vehicle with a tailgate of the vehicle. The tailgate can provide a space for loading, staging, or sitting. For example, the tailgate of the vehicle, such as a hatch-back sport utility vehicle (SUV), can fold from a stowed position to a deployed position. The tailgate can include at least one panel or lateral side. For example, the tailgate can include one, two, three, four, or any number of panels or lateral sides. The panels can deploy from the tailgate, or each other, and lock into place to form a storage area. The panels can lock to form a rigid structure that resists bending. Because the panels can form a storage space on or over the deployed tailgate, the storage space can be at least partially outside the vehicle.

The apparatus can include a first panel or back panel that moves from a stowed position on or parallel with the tailgate to a deployed position on the tailgate (e.g., perpendicular with the tailgate). For example, the back side can deploy up from the tailgate and away from the vehicle. Furthermore, the tailgate can include panels that deploy from the back side or the tailgate itself, e.g., deploy out from the back side towards the vehicle. For example, the panels can be parallel with the back side when stored, and be perpendicular with the back side when deployed. The panels of the tailgate can deploy to form a housing, enclosure, space, box, rear cargo box, three sided box, four sided box, or other storage area. The storage area can be centered on or at least partially positioned on the deployed tailgate, and therefore, the storage area can be at least partially outside the vehicle. This can allow for cargo items to be transported by the vehicle without storing the cargo items within the vehicle, e.g., within the trunk or seating area of the vehicle. Furthermore, the storage space formed outside the vehicle can extend or increase the size of a rear storage area of the vehicle (e.g., a trunk area) and allow long cargo to extend out of the seating area or trunk of the vehicle into the storage space formed outside the vehicle over the tailgate.

The apparatus can be integrated with a tailgate of a vehicle and may not be an add-on component. In some implementations, the apparatus is an add-on component that is coupled with the tailgate of the vehicle to expand the capabilities of the vehicle after it is manufactured, deployed, or sold. Because the apparatus can expand the cargo space of the vehicle, the vehicle can be designed to be smaller (e.g., the vehicle can be a hatch-back SUV, a midsize SUV, or a cross-over SUV instead of a full size SUV or pick-up truck). Furthermore, the vehicle can be designed to include less trunk or passenger space since the apparatus can be deployed to expand or increase the cargo space of the vehicle.

Referring now to FIGS. 1-7, among others, an example vehicle 105 including a storage apparatus 205 that deploys from a tailgate 110 of the vehicle 105. The vehicle 105 can be an electric vehicle, a combustion engine vehicle, or a hybrid vehicle. The vehicle 105 can be a hatch-back SUV, a midsize SUV, or a cross-over SUV instead of a full size SUV or pick-up truck. The vehicle 105 can include at least one hatch 115. The hatch 115 can be door, cover, or panel that can move between an open or closed position. The hatch 115 can move on at least one hinge, coupling, rotating member, connector, or other apparatus. The hinge can couple with a top side of the hatch 115. In this regard, the hatch 115 can rotate upwards away from a surface under the vehicle 105 or away from the tailgate 110 of the vehicle 105. The hinge can be coupled with a top side of the vehicle 105, e.g., at or near a roof of the vehicle 105. The hatch 115 can be a rear hatch, and be disposed on a rear side of the vehicle, e.g., a trailing side of the vehicle 105 as the vehicle 105 moves forward or drives. The hatch 115 can extend from the hinge or top side of the vehicle downwards to cover at least half of a rear opening of the vehicle 105.

The vehicle 105 can include at least one tailgate 110. The tailgate 110 can move, rotate, or translate between a stowed or closed position and a deployed or open position. The tailgate 110 can move on at least one hinge, coupling, rotating member, connector, or other apparatus. For example, the hinge can be disposed on a bottom side of a rear opening of the vehicle 105. The hinge can be coupled with the bottom side of the rear opening of the vehicle 105 and a bottom side of the tailgate 110. When stowed, the tailgate 110 can extend up towards the hatch 115 to cover at least a portion of the rear opening of the vehicle 105. The bottom side of the tailgate 110 can be a side opposite a side of the tailgate 110 that couples with, connects or comes into contact with a bottom side of the hatch 115. The tailgate 110 can rotate downwards on the hinge towards a surface under the vehicle 105, towards a bumper of the vehicle 105, or away from the hatch 115. When the hatch 115 and the tailgate 110 are both closed, the rear opening of the vehicle 105 can be completely covered.

The vehicle 105 can include a rear storage area 120. The rear storage area 120 can be a trunk space or a back portion of the vehicle 105. The rear storage area 120 can extend from a rear end of the vehicle (e.g., a rear bumper, the rear hatch 115, the tailgate 110) to rear passenger seating of the vehicle 105. Passenger seats of the vehicle 105 can fold up, stow, or change position to increase the size of the rear storage area 120.

The vehicle can include at least one storage apparatus 205. The storage apparatus 205 can be coupled with the tailgate 110. The storage apparatus 205 can include the tailgate 110. The storage apparatus 205 can integrate with the tailgate 110. The storage apparatus 205 can include an inner side or surface 305. The storage apparatus 205 can include an outer side or surface 215. The inner side 305 can be opposite the outer side 215. When the tailgate 110 is in an open position, the inner side 305 can be disposed outside the vehicle 105. When the tailgate 110 is in a closed position, the inner side 305 can be disposed, contained, or positioned within the vehicle 105. When the tailgate 110 is in the open position or the closed position, the outer side 215 can be disposed or positioned outside the vehicle 105.

The storage apparatus 205 can include at least one panel 210. The panel 210 can be a rear panel or a back plate. The panel 210 can have a rectangular shape or rectangular cross-section, a rectangular solid shape, a square shape or square cross-section, etc. The panel 210 can be a plastic, material, wood, or ceramic material. For example, the panel 210 can be or include polypropylene, polyethylene, polyvinyl chloride, polystyrene, or any other type of plastic. The panel 210 can include a metal, such as aluminum, steel, or coper.

The panel 210 can couple with the tailgate 110, connect with the tailgate 110, or attach to the tailgate 110. The panel 210 can be coupled with the tailgate 110 via at least one hinge. The hinge can include a first side, end, or edge coupled with the tailgate 110. The hinge can include a second side, end, or edge coupled with the panel 210. The hinge can rotate, move, turn, or translate the panel 210 between two or more positions, a set of discrete positions, or a continuous range of positions. For example, the hinge can rotate the panel 210 from a first or stowed position to a second or deployed position. The hinge can rotate the panel 210 from the first position a particular angle amount to the second position. For example, the hinge can rotate the panel 210 from the first position ninety degrees to the second position. The angle amount can be 85-95 degrees. The angle amount can be 80-100 degrees. The angle amount can be less than 80 degrees. The angle amount can be greater than 100 degrees. The angle amount can be an angle formed between the panel 210 in the first position and the panel 210 in the second position. The angle amount can be an angle formed between the top side 305 or the bottom side 215 and the panel 210 in the second position.

The panel 210 can include a first end or side 440 and a second end or side 445. The first side 440 can be opposite the second side 445. The first side 440 can be free and not coupled with the tailgate 110 or any other component. The second side 445 can be coupled with the tailgate 110. For example, the second side 445 can be coupled with a top end or top side 450 of the tailgate 110. The top end or side 450 of the tailgate 110 can be opposite a second side or end of the tailgate 110 that couples with the vehicle 105. The hinge can rotate the first end 440 upwards away from the top surface 305 or bottom surface 215 of the tailgate 110 or away from the vehicle 105.

The panel 210 can be limited in movement. For example, the hinge or other component 210 can limit the panel 210 to move between the first position and the second position, and resist the movement of the panel 210 if the panel is attempted to be moved outside the set of angles between the first position and the second position. For example, the hinge or another component, such as a wall or stopper can limit the movement of the panel 210. For example, the panel 210 can be moved from the first position ninety degrees to the second position. The hinge, or another mechanism, can resist or prevent further movement past the second position or past ninety degrees. Furthermore, the panel 210 can limit the movement of the panel 210 in the first position. For example, the hinge can limit or resist the movement of the panel 210 past the first position when the panel 210 moves downwards away from the second position. Furthermore, the top side 305 of the tailgate 110 can resist or limit movement of the panel 210 past the first position. For example, in the first position, the panel 210 can rest upon, or at least partially cover, the top side 305.

In the first position, the panel 210 can be parallel with at least a portion of the top side 305 or the bottom side 215 of the tailgate 110. In the first position, when the tailgate 110 is opened, the panel 210 can be parallel with or flush with a panel 220. Furthermore, in the first position, when the tailgate 110 is opened, the panel 210 can be parallel with a surface under the vehicle. In the second position, the panel 210 can be perpendicular with at least a portion of the top side 305 or the bottom side 215 of the tailgate 110. Furthermore, in the second position, when the tailgate 110 is opened, the panel 210 can be perpendicular with a panel 220. Furthermore, in the second position, when the tailgate 110 is opened, the panel 210 can be perpendicular with a surface under the vehicle 105 that the vehicle 105 rests upon.

When the panel 210 moves from the first position to the second position, the panel 210 can form at least a portion of at least one storage space 310. The storage space 310 can be an area, a region, or a partially or fully enclosed space. The storage space 310 can be formed between the inner sides of the panel 210 and the panels 405. The storage space 310 can be centered over or at least partially disposed over or on the tailgate 110. The storage space 310 can be an extension of the rear storage area 120. The storage space 310 can be at least partially outside the vehicle 105 or fully formed outside the vehicle. Cargo can be disposed in the storage space 310 to completely or partially dispose the cargo outside the vehicle 105. The rear storage area 120 can be at least partially within the vehicle 105 or fully within the vehicle 105. The storage space 310 can extend the rear storage area 120 out of the vehicle 105 such that cargo can be disposed in the vehicle 105 that extends from within the vehicle 105 to outside the vehicle 105.

The storage apparatus 205 can include at least one panel 405. The panels 405 can be side panels. The panels 405 can have a rectangular shape or rectangular cross-section, a rectangular solid shape, a square shape or square cross-section, etc. The panels 405 can be a plastic, material, wood, or ceramic material. For example, the panel 210 can be or include polypropylene, polyethylene, polyvinyl chloride, polystyrene, or any other type of plastic. The panels 405 can include a metal, such as aluminum, steel, or coper. The storage apparatus 205 can include a first or driver side panel 405 to deploy towards the driver side of the vehicle 105. The storage apparatus 205 can include a second or passenger side panel 405 to deploy towards the passenger side of the vehicle 105. The first and second panels 405 can be the same size and have the same dimensions. The first and second panels 405 can be mirrored copies of each other.

The panels 405 can be coupled with the panel 210 and deploy from the panel 210 to form the storage space 310. For example, the panels 405 can be coupled with the panel 210 via at least one hinge such that the panels 405 can move, rotate, or turn about the panel 210. A first end of the hinge can be coupled with the panel 210 and a second end of the hinge can be coupled with the panel 405. The hinge can move the panel from a first position parallel with the surface of the panel 210 to a second position perpendicular to the panel 210 and to the top surface 305 of the tailgate 110 or the bottom surface 215 of the tailgate 110. The hinge can rotate, move, turn, translate, or position the panels 405.

A first hinge can include a first end coupled with a driver side panel 405 and a second end coupled with the panel 210. The driver side panel 405 can rotate on the first hinge from the first position to the second position. The driver side panel 405 can rotate or move the panel 405 from the panel 210 towards the vehicle 105 or towards a driver side of the vehicle 105. A second hinge can include a first end coupled with a passenger side panel 405 and a second end coupled with the panel 210. The passenger side panel 405 can rotate on the second hinge from the first position to the second position. The passenger side panel 405 can rotate or move the panel 405 from the panel 210 towards the vehicle 105 or towards a passenger side of the vehicle 105.

The first panel 405 and the second panel 405 can deploy from the panel 210 to form the storage area 310. The first panel 405 and the second panel 405 can deploy to form lateral sides of the storage area 310. The first panel 405, the second panel 405, and the panel 210 can form a boundary to at least partially enclose the top surface 305 of the tailgate 110. The first panel 405, the second panel 405, and the panel 210 can form a compartment that can store components, e.g., restrict or limit movement of the components, e.g., contain the cargo to be within the storage area 310. The driver side panel 405 can form a first side of the compartment along an outer side or edge of the tailgate 110. The passenger side panel 405 can form a second side of the compartment along an outer side or edge of the tailgate 110. The panel 210 can form a third side of the compartment along an outer side or edge of the tailgate 110.

The panels 405 can be disposed on opposite sides 410 of the panel 210, e.g., a driver side of the panel 210 and a passenger side of the panel 210. The panels 405 can be disposed in a first or stowed position. The panels 405 can be parallel with each other and an outer surface of the panel 210 in the first position. Each panel 405 can have a length 415 that is equal to or less than half of a length 420 of the panel 210, such that when the panels 405 are folded into the first position, ends of the panels 405 do not overlap or come into contact. The length 420 of the panel 210 can be 115-120 centimeters. The length 420 of the panel 210 can be 110-125 centimeters. The length 420 of the panel 210 can be less than 110 centimeters. The length 420 of the panel 210 can be greater than 125 centimeters. The panels 405 can have a length 415 that is 55-60 centimeters. The panels 405 can have a length 415 that is 50-65 centimeters. The panels 405 can have a length that is less than 50 centimeters. The panels 405 can have a length 415 that is greater than 65 centimeters. The panels 210 or 415 can have a width 435. The width 435 can be 5-10 centimeters. The width 435 can be 3-13 centimeters. The width 435 can be less than 3 centimeters. The width 435 can be greater than 13 centimeters.

The length 415 of the panel 405 can be equal to or greater than a height 430 of the tailgate 110. In this regard, when the panels 405 are deployed, the panels 405 can extend to or into vehicle, e.g., into the storage space 120. The height 430 of the tailgate 110 can be 35-40 centimeters. The height 430 of the tailgate 110 can be 30-45 centimeters. The height 430 can be less than 30 centimeters. The height 430 can be greater than 45 centimeters.

The tailgate 110 can include at least one ramp 225. The ramps can be disposed on opposite ends of the tailgate 110. For example, a first ramp 225 can be disposed on a first side of the tailgate on a driver side of the vehicle 105, and the second ramp 225 can be disposed on a second side of the tailgate 110 on a passenger side of the vehicle 105. The ramp 225 can extend upwards or away from the surface 305, e.g., in a direction perpendicular to the surface 305. The ramps 225 can form a right angle with the top surface 305 or the bottom surface 215 of the tailgate 110. The ramps 225 can limit, stop, or resist movement or rotation of the panels 405. For example, the outer surfaces of the panels 405 can swing outwards from the panel 210 to the respective ramps 225. The ramps 225 can limit, stop, or resist furth outward motion of the panels 405.

The vehicle 105 or the apparatus 205 can include at least one latch 240. The latch 240 can be a locking mechanism, a coupling, or a connector. A first latch 240 can be disposed on a first side of the vehicle 105, such as a driver side of the vehicle 105. A second latch 240 can be disposed on a second side of the vehicle 105, such as a passenger side of the vehicle 105. The hatch 115 can include components 245 that meet with, connect to, or couple with the latches 240 when the hatch 115 is closed. The hatch 115 can include a first component 245 disposed on a first or driver side of the hatch 115. The hatch 115 can include a second component 245 disposed on a second or passenger side of the hatch 115. The component 245 and latch 240 can form a tongue and groove connector. The hatch 115 can be secured or have its movement limited by a coupling between the components 245 and the latches 240. Responsive to a button press, command, or mechanical input, the latch 240 can release the components 245 and allow the hatch 115 to open.

The vehicle 105 or the apparatus 205 can include at least one latch 235. The latch 235 can be a locking mechanism, a coupling, or a connector. A first latch 235 can be disposed on a first side of the vehicle 105, such as a driver side of the vehicle 105. A second latch 235 can be disposed on a second side of the vehicle 105, such as a passenger side of the vehicle 105. The tailgate 110 can include components 230 that meet with, connect to, or couple with the latches 235 when the tailgate 110 is closed. The tailgate 110 can include a first component 230 disposed on a first or driver side of the tailgate 110. The tailgate 110 can include a second component 230 disposed on a second or passenger side of the tailgate 110. The component 230 and latch 235 can form a tongue and groove connector. The tailgate 110 can be secured or have its movement limited by a coupling between the components 230 and the latches 235. Responsive to a button press, command, or mechanical input, the latch 235 can release the components 230 and allow the tailgate 110 to open.

The panels 405 can include components, mechanisms, or features, such as the component 230. For example, the panels 405 can include a mechanism at or near an end of the panels 405 that swings into the vehicle 105, e.g., an end opposite and end of the panel 405 coupled with the panel 210 via a hinge. The end of the panels 405 can couple with the latches 235. For examples, the ends of the panels 405 including the components can couple with the latches 235 via the components.

Figure 7:
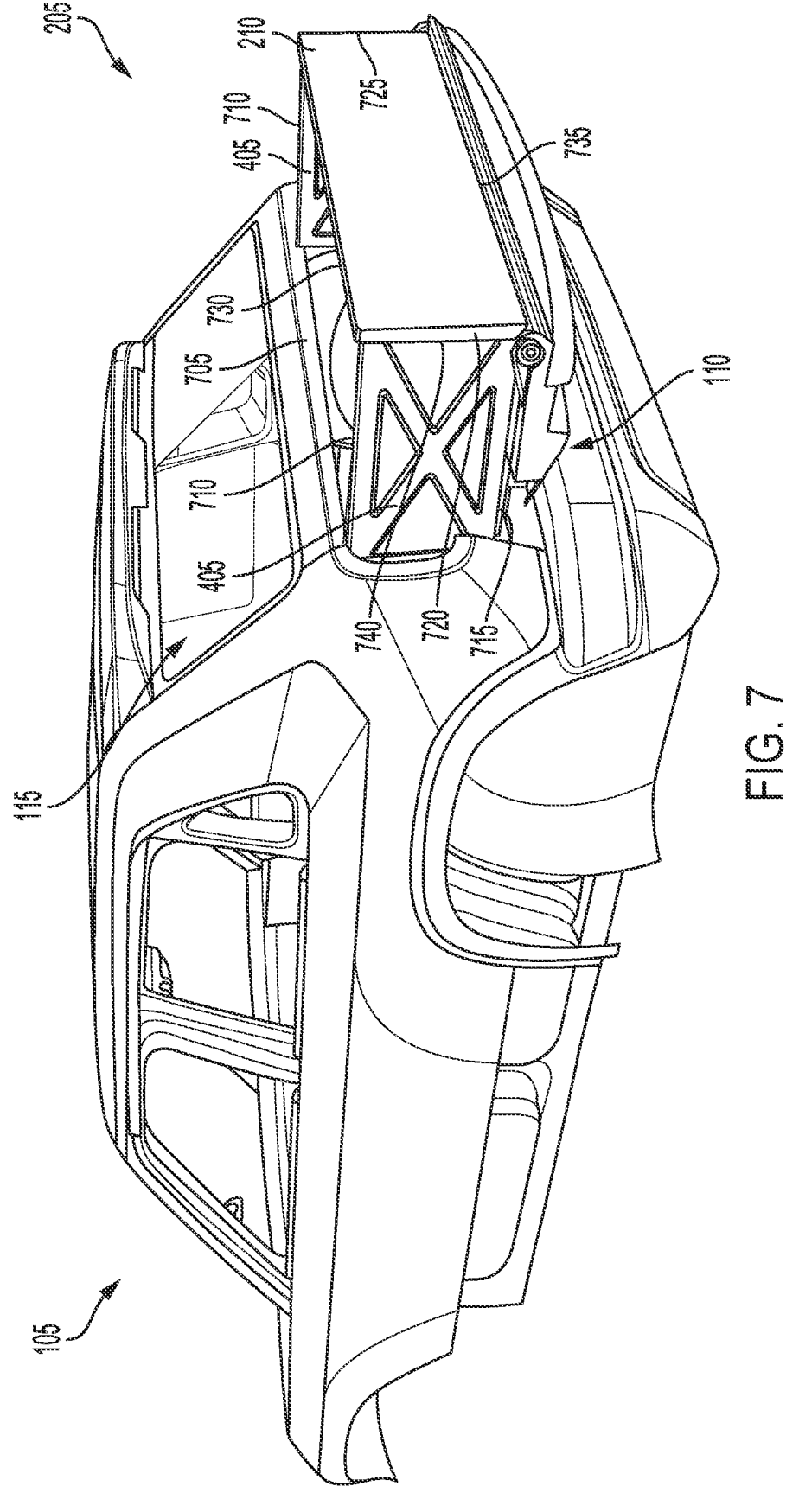

In FIG. 7, the hatch 115 is closed. The hatch 115 can rest upon, connect with, or couple with the panels 405. For example, a bottom edge 705 can connect with, touch, or couple with a top edge 710 of the panels 405. The edges 710 can be top edges of the panels 405 opposite bottom edges 715 of the panels 705. The edge 710 can be opposite the edge 715. The edge 715 can be coupled with, connect with, touch, or be disposed near the top surface 305 of the tailgate 110. The panel 405 can include an end or edge 740. The edge 740 can be coupled with the edge 720 of the panel 210 via a hinge. The ends 715 and 715 can extend from the edge 740 to a free end. The free end can rotate about the end 740 to deploy. The ends 715 and 710 can be parallel with each other. The ends 715 and 710 can be perpendicular to the end 740.

The panel 210 includes edges 720 and 725 opposite each other. The edges 720 and 725 can form a height or width of the panel 210. The panels 405 can rotate about the edges 720 and 725 respectively. For example, a driver side panel 405 can be coupled, via a hinge, with the end 720, while a passenger side panel 405 can be coupled, via a hinge, with the edge 725. The panel 210 can extend from the end 720 to the end 725 to form a length of the panel 210. The panel 210 can include ends or edges 730 and 735. The edge 730 can be opposite the edge 735. The edge or end 735 can be coupled with the tailgate via a hinge. The edge or end 730 can be free, and rotate or move about the end or edge 735 via the hinge. The edge 730 and the edge 735 can be parallel. The edges 720 and 725 can be parallel. The edges 730 and 735 and be perpendicular with the edges 720 and 725.

Figure 8:
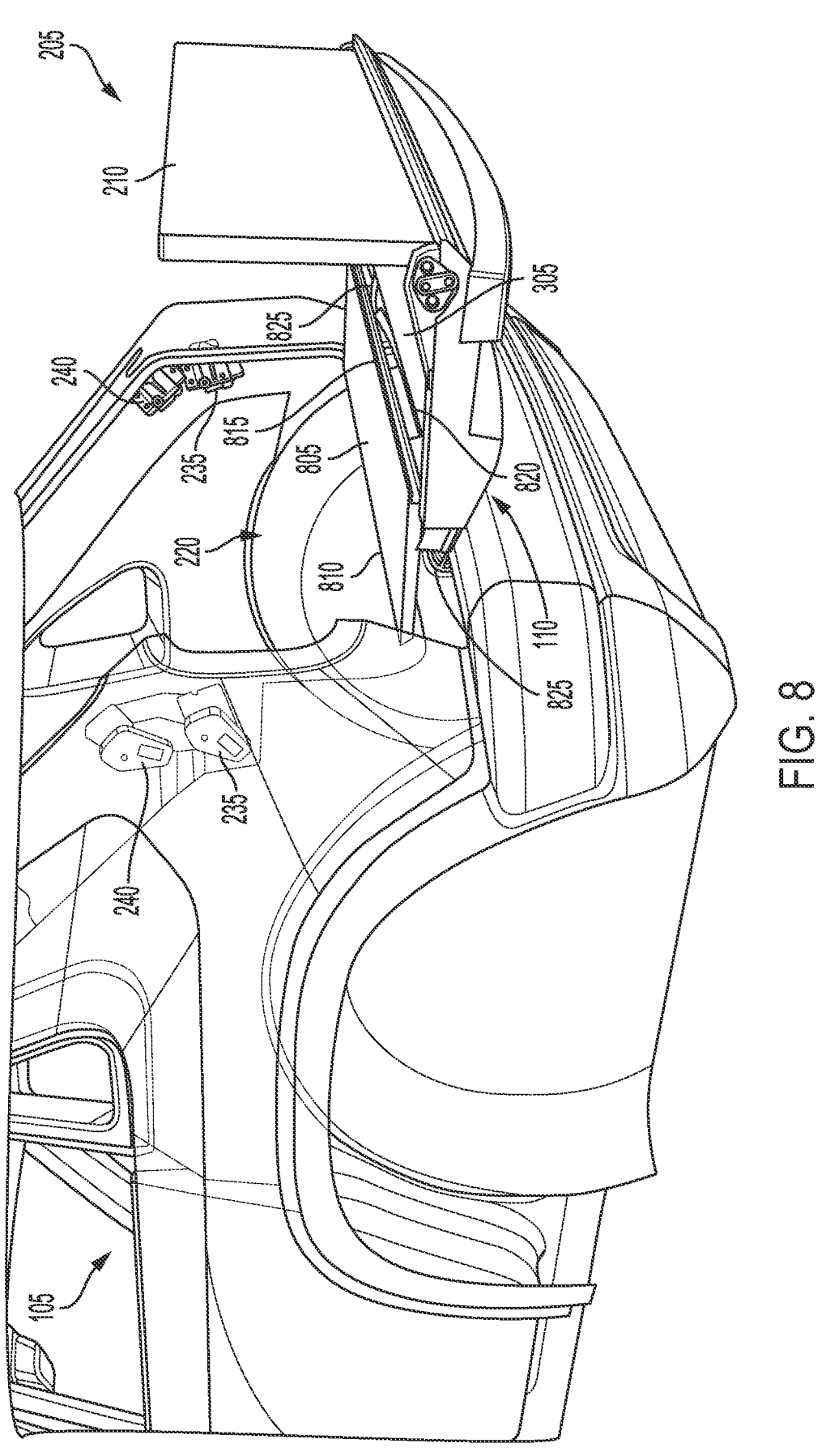
FIG. 8 depicts an example support member of a tailgate and a plate that covers the support member.

Referring now to FIG. 8, among others, an example support member 825 of a tailgate 110 and the plate 220 that covers the support member 825. The tailgate 110 can include or be coupled with at least one support member 825. The support members 825 can be curved brackets, U-shaped brackets, a bracket that forms a right angle, an arm, a component, or an apparatus. The tailgate 110 can be coupled with a first end of the support members 825, and a second end of the support members 825 can be coupled with the vehicle 105. The tailgate 110 can include a first support member 825 on a driver side of the vehicle 105, and a second support member 825 on a passenger side of the vehicle 105.

The support members 825 can be components of a hinge that couples the tailgate 110 with the vehicle 105 and moves the tailgate 110 between a closed and opened position. A first end of the support members 825 can be coupled with the tailgate 110. A second end of the support members 825 can be coupled with the vehicle 105 or a hinge component of the vehicle 105. When the tailgate 110 is open, the tailgate 110 can be supported off of an end or rear of the vehicle 105. The support members 825 can support the weight of the tailgate 110 in addition to any cargo placed on the tailgate 110 or within the storage area 310. The support members 825 can cantilever the tailgate 110 from the rear end of the vehicle 105 or off the vehicle 105.

The storage apparatus 205 can include at least one plate 220 that covers the support members 825. The plate 220 can cover the support members 825 when the tailgate 110 is opened or in a deployed position. The plate 220 can be coupled with the tailgate hinge, and move with the tailgate 110 when the tailgate is opened. For example, the plate 220 can include a first edge, end, or side 810 that couples with the vehicle 105 or with the hinge. The plate 220 can include a second edge, end, or side 815 that is free. When the tailgate 110 is closed, the plate 805 can be stored vertically, parallel with the surfaces 305 or 215 of the tailgate 110. When the tailgate 110 is closed, the upper or outer surface of the plate 805 can be perpendicular with the floor of the vehicle 105 or a surface under the vehicle 105. When the tailgate 110 opens, the plate 220 can translate, move, or rotate from the vertical position to a horizontal position. For example, the plate 220 can move an angle distance, e.g., ninety degrees from the vertical position to the horizontal position. The plate 220 can move or rotate about the edge 810, and move the edge 815 downwards towards the tailgate 110 or downwards towards a surface under the vehicle. When deployed, the plate 220 can form a surface that is flush with the top surface 305 of the tailgate 110. For example, the edge 815 can meet or touch an edge 820 of the tailgate. In this regard, the surface 805 and the surface 305 can be flush, or one continuous surface.

Figure 9:
FIG. 9 depicts an example tailgate including a tail light.

Referring now to FIG. 9, among others, depicts an example tailgate including a taillight 900. The tail light 900 can be a device or apparatus including one or multiple lights that illuminate responsive to a command by a user or a command by a computing system, e.g., in response to a user braking the vehicle 105, in response to a user pressing a brake of the vehicle 105, responsive to a user interacting with a hazard flashing button of the vehicle 105, a user providing input to turn on a left turn or right turn signal, etc. The tail light 900 can include one or multiple lights, such as light emitting diodes, halogen lights, high intensity discharge lights.

The lights can be oriented in different directions. For example, a first light or first set of lights can be oriented in the tail light 900 to provide light in the direction 910. For example, a second light or a second set of lights can be oriented in the tail light 900 to provide light in the direction 915. The tail light 900 can include lights disposed along the length 920 of the tail light 900. For example, the lights can be disposed in equal or non-equal increments along the length 920 of the tail light 900. For example, the lights can be disposed every 10-20 centimeters. The lights can be disposed every 5 to 25 centimeters. The lights can be disposed in increments less than 5 centimeters. The lights can be disposed in increments greater than 25 centimeters. The length 920 of the tail light 900 can be greater than 125 centimeters. The length 920 of the tail light 900 can be 115-120 centimeters. The length 920 of the tail light 900 can be 110-125 centimeters. The length of the tail light 900 can be less than 110 centimeters. The length 920 of the tail light 900 can be greater than 125 centimeters.

The tail light 900 can include a housing 925. The housing 925 can be a glass, plastic, transparent material, semitransparent material, that covers lights, wires, or electronic components of the tail light 900. The housing 925 can be colored a particular color, such as red, yellow, or orange to produce light of the particular color. The housing 925 can include at least one lateral side. For example, the housing 925 can include a bottom or outer surface 930. The outer surface 930 can be disposed on the bottom side 215 of the tailgate 110. The outer surface 930 can face downwards along the direction 910 towards a surface under the vehicle 105 when the tailgate 110 is in an open position. The outer side 930 can face backwards along the direction 915 towards an observer or vehicle behind the vehicle 105 when the tailgate 110 is closed. The housing 925 can include a top side 935. The top side 935 can cover at least a portion of a top side 450 of the tailgate 110. The top side 935 of the housing 925 can be flush or parallel with the top side 450 of the tailgate 110. The top side 935 can face backwards along the direction 915 towards an observer or vehicle behind the vehicle 105 when the tailgate 110 is an open position. The outer side 930 and the top side 935 can be disposed in planes that are perpendicular to each other. The outer side 930 and the top side 935 can curve along a length of the taillight 900. The outer side 930 and the top side 935 can form concave shapes relative to the interior of the vehicle 105.

The housing 925 can include ends 940. The ends 940 can be caps or surfaces disposed on the driver and passenger sides of the housing 925. The ends 940 can be parallel with each other. The ends 940 can be disposed on or over ends 905 of the tailgate 110. The ends 940 of the tailgate 110 can be disposed opposite each other and parallel to each other. The ends 905 can be disposed within an interior of the vehicle 105 when the tailgate 110 is closed, and disposed outside the vehicle 105 when the tailgate 110 is open. The ends 905 can extend between the inner surface 305 and the outer surface 215 of the tailgate 110. The ends 905 can be disposed on opposite sides of the inner surface 305 or the outer surface 215. The ends 905 can form a surface perpendicular with the inner surface 305 or the outer surface 215.

The tail light 900 can provide light in both directions 910 and 915. For example, the tail light 900 can simultaneously, concurrently, or at the same time provide light in direction

Figure 10:
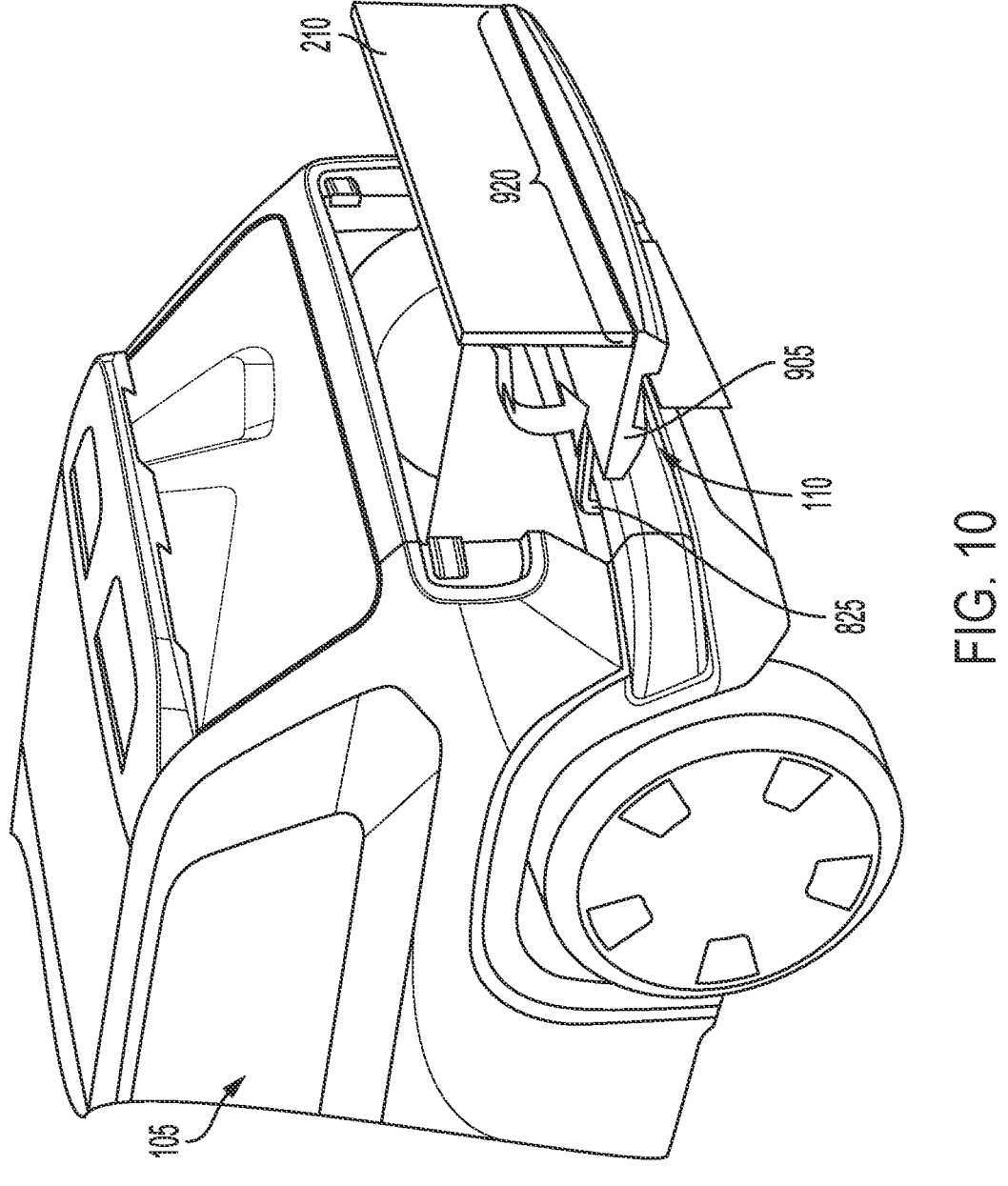
FIG. 10 depicts an example support member of a tailgate.

910 and direction 915. The tail light 900 can be configured to provide light in directions 910 and 915 selectively. For example, by turning various lights of the tail light 900 on and off together, the tail light 900 can provide light in the direction 910 and not the direction 915, or provide light in the direction 915 and not in the direction 915. The directions 910 and 915 can be relative to the tailgate 110, e.g., their orientation can be based on the position and orientation of the tailgate 110. The directions 910 and 915 can be perpendicular or orthogonal with each other. The tail light 900 can provide light in direction 910 orthogonal to the surface of the outer side 215 of the tailgate 110. Furthermore, the tail light 900 can provide light in the direction 915 orthogonal to the surface of the top side 450. The tail light 900 can provide light in the direction 915 relative to the tailgate 110 when the tailgate 110 is open by turning on a first set of lights of the tail light 900, and not provide light in the direction 910 by turning off a second set of lights, Referring now to FIG. 10, among others, an example support member 825 of the tailgate 110 is shown. The support member 825 can be extend from a frame of the vehicle 105 to the tailgate 110. The support member 825 can support the tailgate 110. In FIG. 10, the plate 220 is removed or not included, and therefore the support member 825 is exposed. The member 825 can be disposed a distance from the end 905 of the tailgate 110. For example, the member 825 can be disposed 10-20 centimeters from the end 905 of the tailgate 110. The member 825 can be disposed 5-25 centimeters from the end 905 of the tailgate 110. The member 825 can be disposed less than 5 centimeters from the end 905 of the tailgate 110. The member 825 can be disposed more than 25 centimeters from the end 905 of the tailgate 110.

The tailgate 110 can be supported by one, two, three, or any number of support members 825. For example, the tailgate 110 can include a driver side member 825 on a driver side of the vehicle a distance from the end 905 of the tailgate 110. Similarly, the tailgate 110 can include a passenger side member 825 on a passenger side of the vehicle 105 the same distance (or a different distance) from the opposite end 905 of the tailgate 110. The tailgate 110 can include a member 825 disposed at or near a center of the length 920 of the tailgate 110.

The members 825 can include first ends coupled with or fixed directly or indirectly to a frame of the vehicle 105 to support at least a portion of the weight of the tailgate 110 when the tailgate 110 is opened or closed. The support members 825 can be components of, or interface with, a hinge. Second ends of the members 825 can be coupled with or fixed to the tailgate 110. The support members 825 can rotate on the hinges upwards away from a surface under the vehicle 105 or downwards towards a surface under the vehicle 105. The support members 825, via the hinge, can move, rotate, or turn the tailgate 110 between positions, e.g., from a closed position to an open position.

Figure 11:
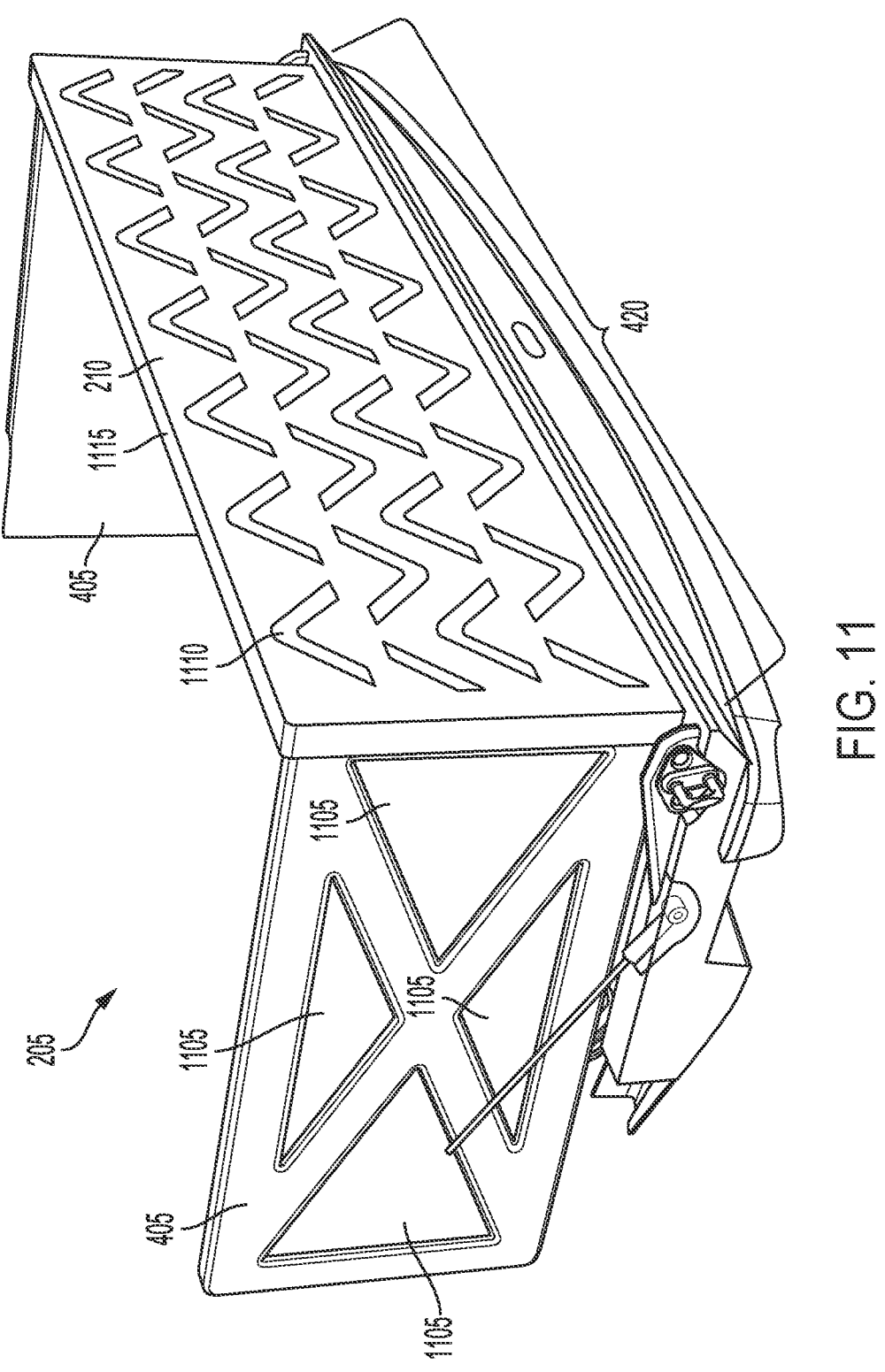
FIG. 11 depicts an example storage apparatus including patterned panels.

Referring now to FIG. 11, among others, an example storage apparatus 205 including patterned panels 405 and 210 is shown. The panels 405 can be patterned with x-shapes or triangle shapes. The patterned panel 405 can include at least one triangular shaped feature 1105. The feature 1105 can be an isosceles triangle shape. For example, the panels 405 can be molded to include an x-shape that connects corners of the corners of the panel 405. For example, the surface of the panel 405 can be sunken, deformed, or intended to form at least one triangular feature 1105. An edge of each triangular feature 1105 can be parallel with an outer edge of the panel 405. A corner of each triangular feature 1105 can be located at or near a center of the panel 405. The patterning of the panels 405 can provide increased strength to bear a load, resist flexing or bending, or stand upright.

The panel 210 can include patterning. For example, the panel 210 can include features 1110 having a v-shapes or wedge shapes. A surface of the panel 210 can be sunken, deformed, intended to form the features 1105. The panel 210 can include rows of features 1110 in alternating orientations. For example, features 1105 disposed in equal intervals across the length 420 of the panel 210 equal distances from the free end 1115 of the panel 210. All of the features 1105 can have an orientation directing the point or apex of the feature 1105 upwards towards the edge 1115. For example, an orientation of the point towards the edge 1115 can be perpendicular to the length 420 of the panel 210. A second row of features 1110 can be disposed under the first row pointing in an opposite direction, e.g., the apex or point of the feature can point towards opposite the first row of features 1110. The panel 210 can include a third, fourth, or any other number of rows of the features 1110.

Figure 12:
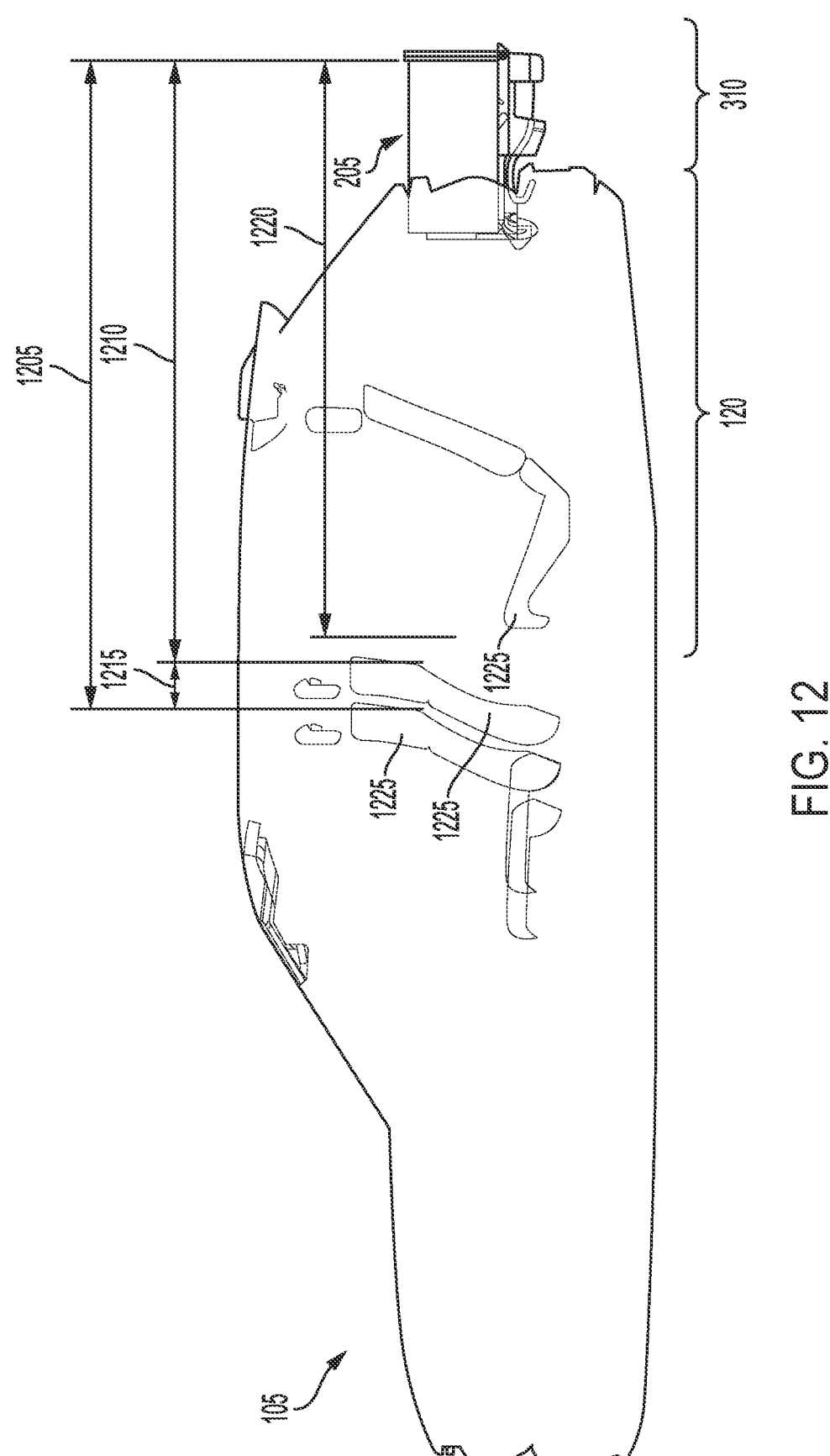
FIG. 12 depicts an example vehicle including a storage apparatus.

Referring now to FIG. 12, among others, an example vehicle 105 including a storage apparatus 205 is shown. The storage apparatus 205 can extend the cargo area 120 of the vehicle 105 outside of the vehicle 105. For example, cargo that extends from the cargo area 120 into the storage area 310 can be transported by the vehicle 105. The storage area 120 and the storage area 310 together can have a length 1220. The length 1220 can be 1880-1900 millimeters. The length 1220 can be 1875-1905 millimeters. The length can be less than 1875 millimeters. The length 1220 can be greater than 1905 millimeters. A length 1210 from the rear of a front seat 1225 of the vehicle 105 to the end of the storage apparatus 205 can be 1990-2000 millimeters. The length 1210 can be 1985-2005 millimeters. The length 1210 can be less than 1985 millimeters. The length 1210 can be greater than 2005 millimeters.

The front seats 1225 can translate or move towards the front of the vehicle away from the storage apparatus 205. The seats 1225 can translate forward by 145-155 millimeters. The seats 1225 can translate forward by 140-160 millimeters. The front seats 1225 can translate forward a distance less than 140 millimeters. The front seats 1225 can translate forward a distance greater than 160 millimeters. The resulting movement of the front seats 1225 can increase the length between the front seats 1225 and the end of the storage apparatus 205. For example, the distance 1205 can be 2140-2150 millimeters. The distance 1205 can be 2135-2155 millimeters. The distance 1205 can be less than 2135 millimeters. The distance 1205 can be greater than 1255 millimeters.

Figure 13:
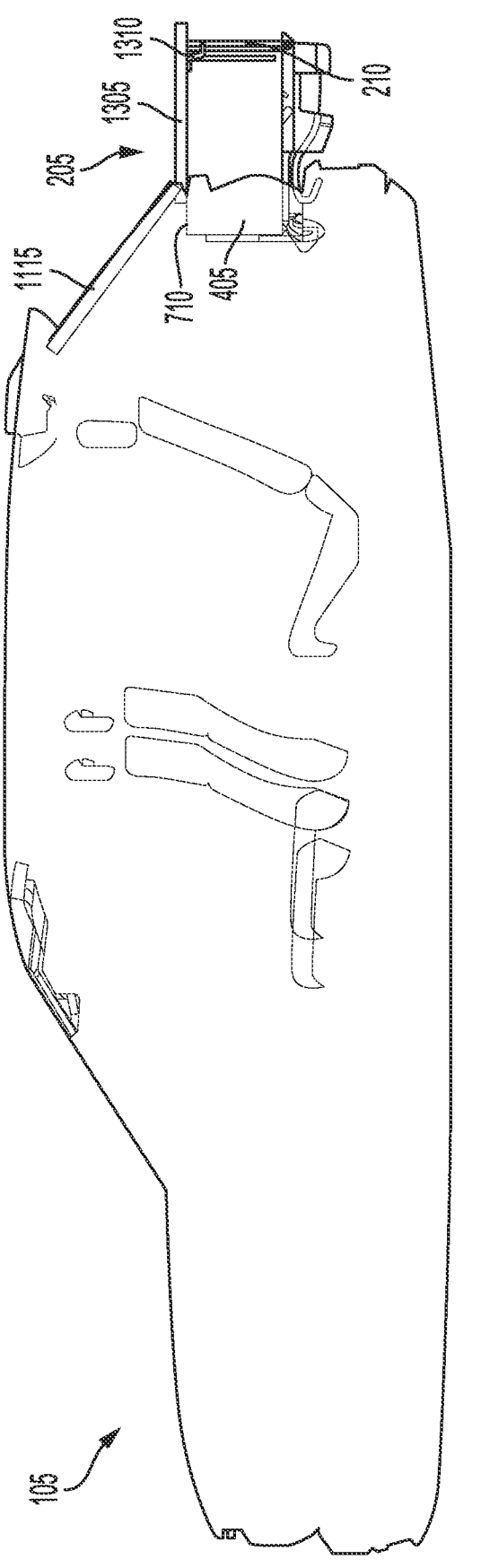
FIG. 13 depicts an example vehicle including a storage apparatus and a cover plate.
Figure 14:
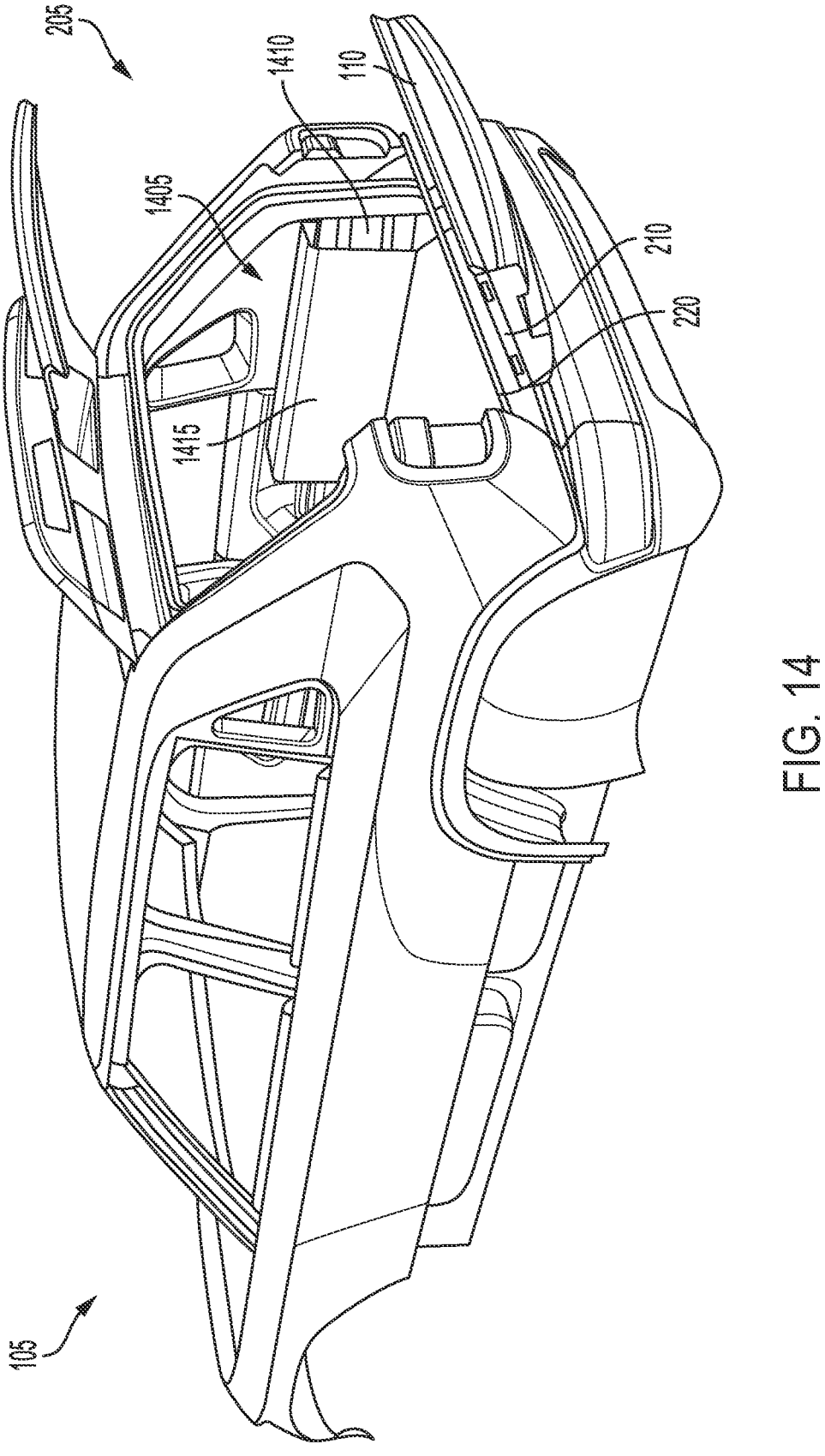
FIGS. 14-21 depict an example vehicle including a roller apparatus that unrolls a sheet of fabric to form a storage area.
Figure 15:
Figure 16:
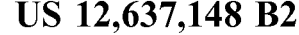
Figure 17:
Figure 18:
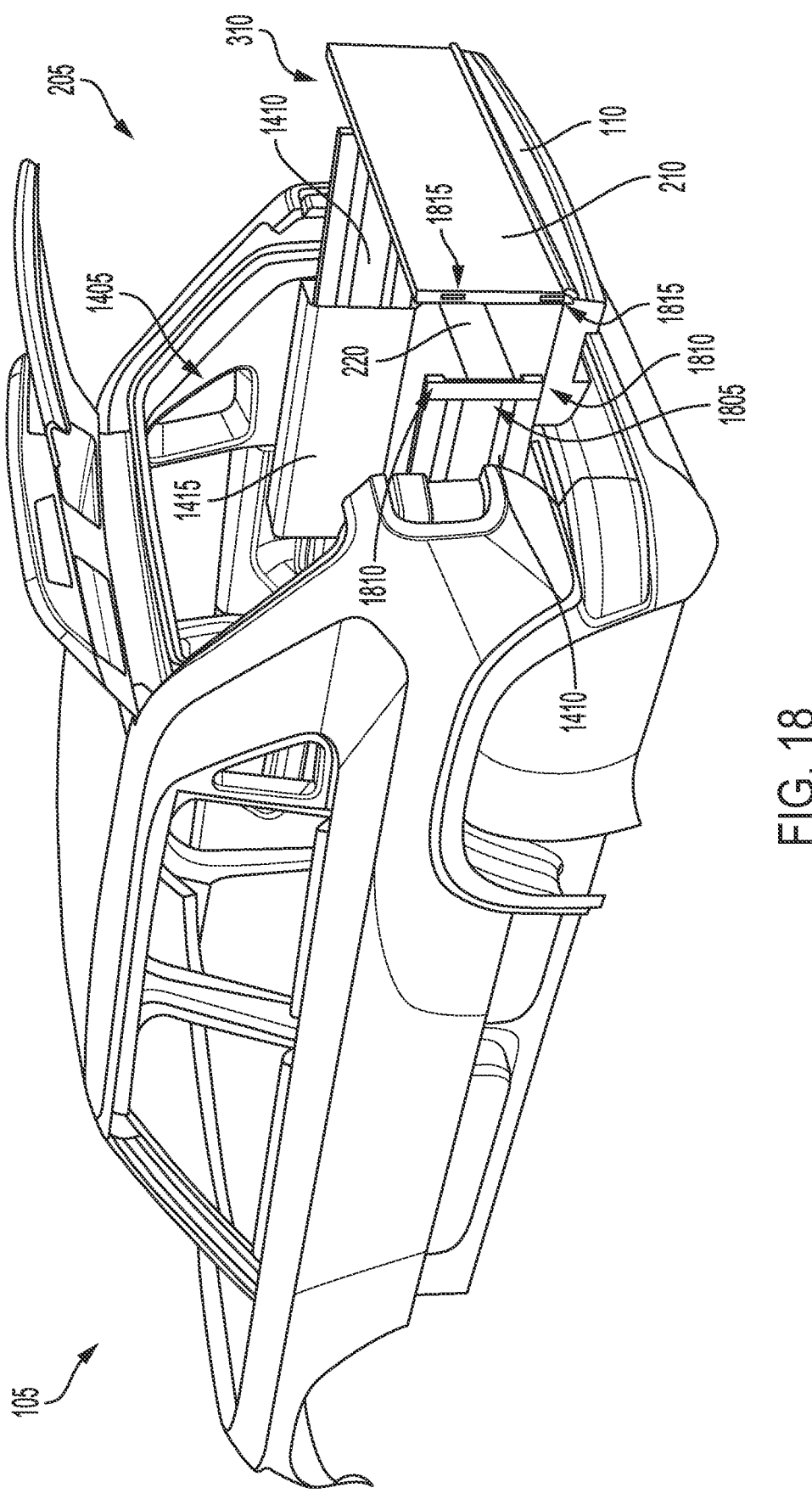
Figure 19:
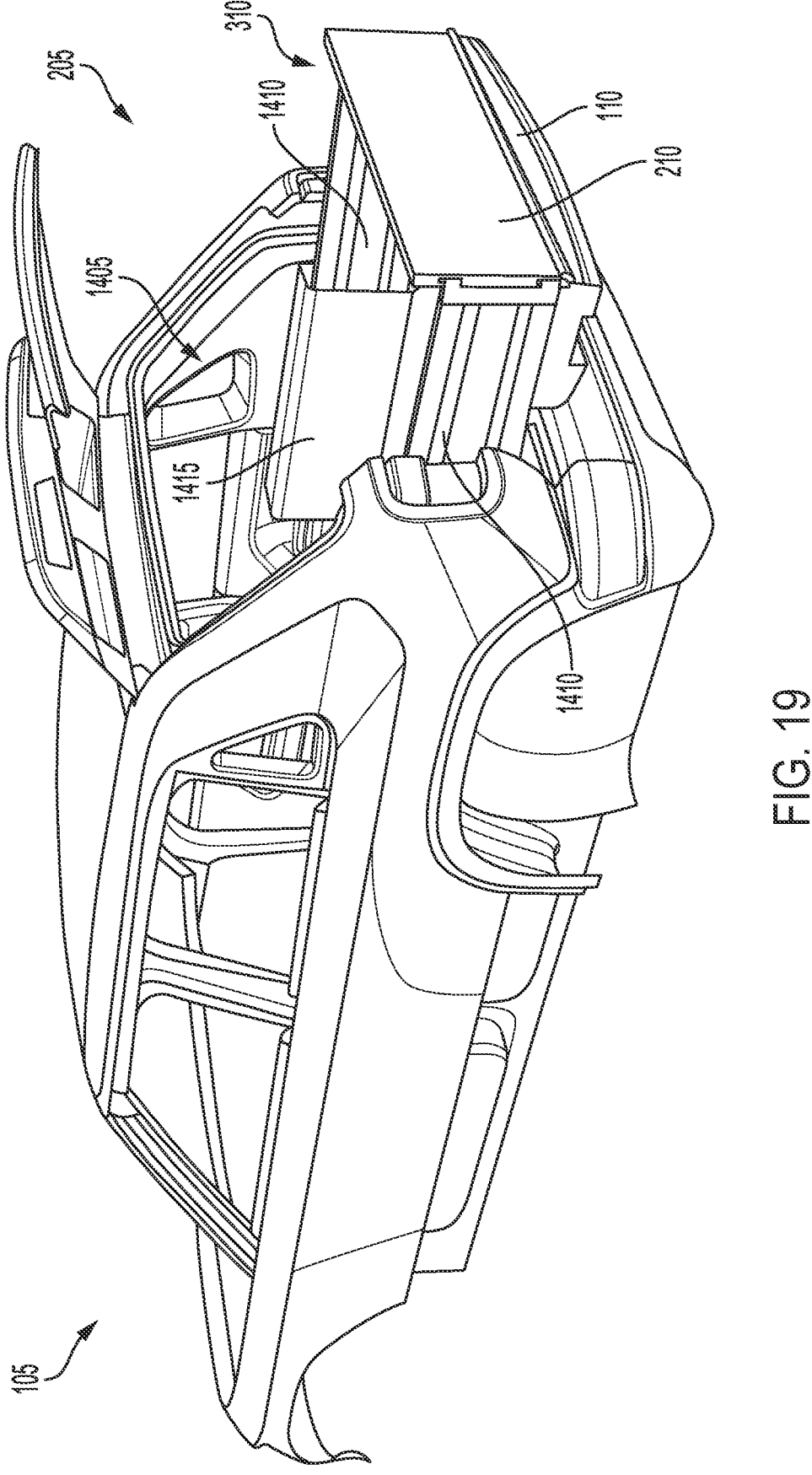
Figure 20:
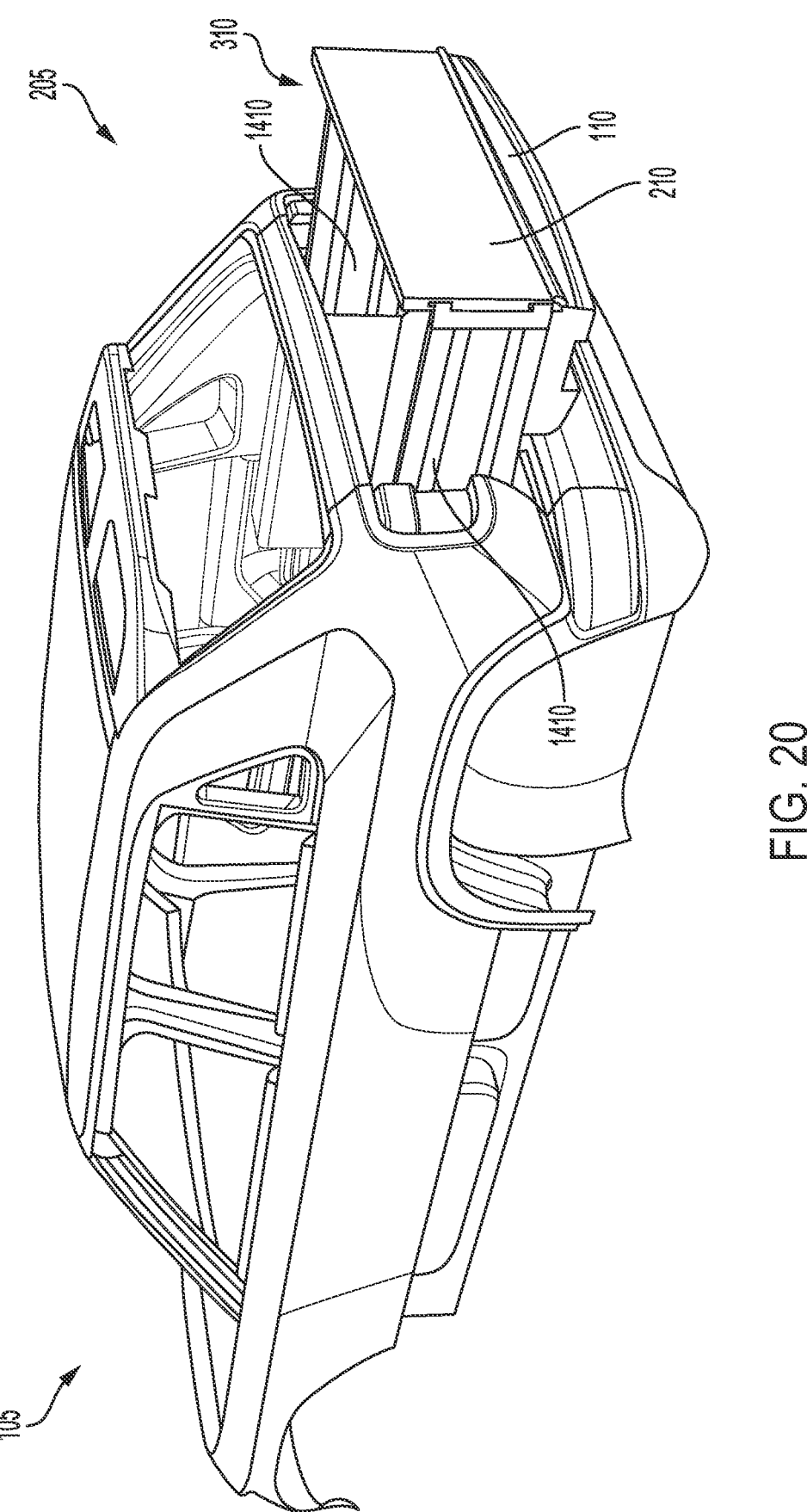
Figure 21:
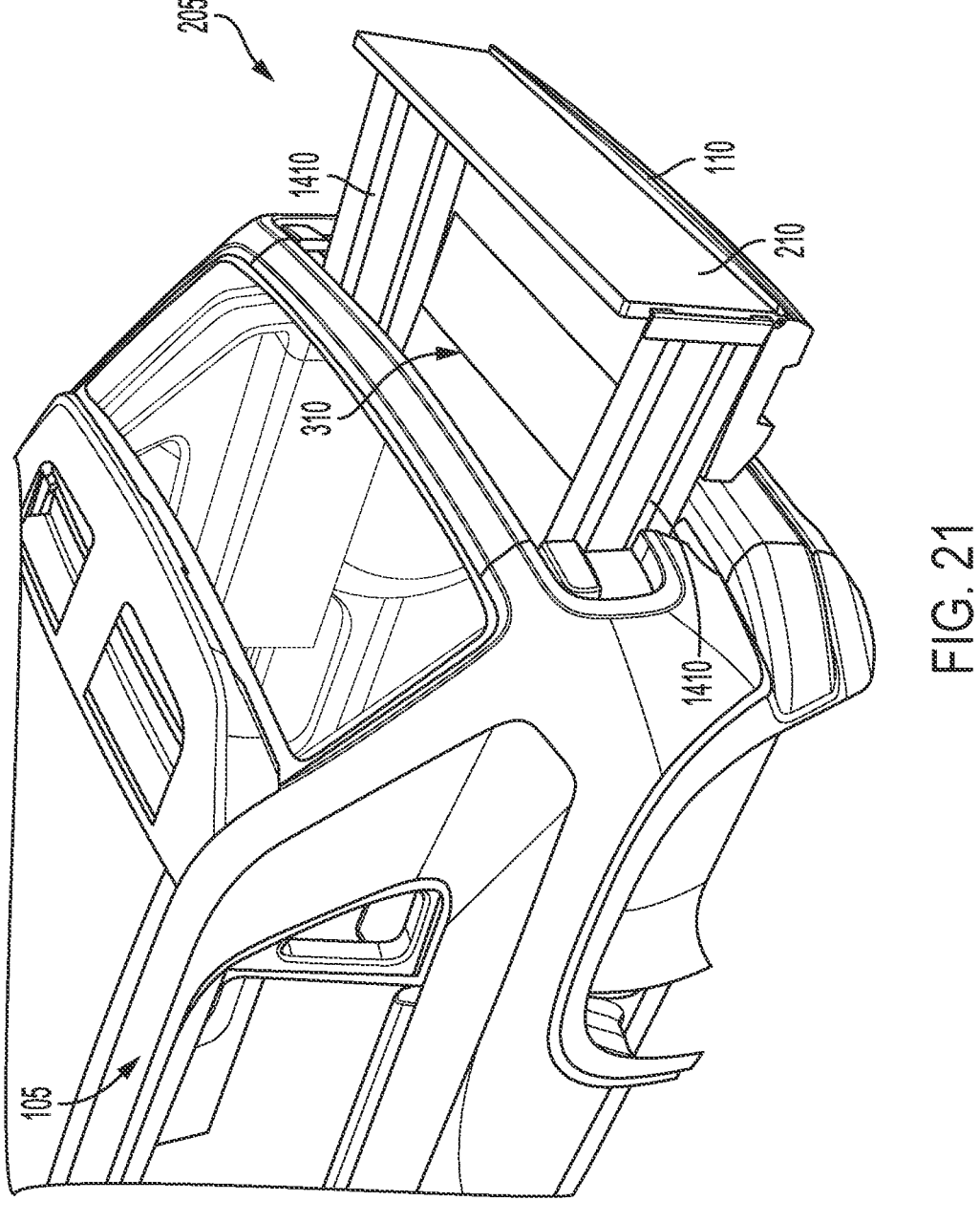

Referring now to FIG. 13, among others, an example vehicle 105 including a storage apparatus 205 and a cover plate 1305 is shown. The storage apparatus 205 can include at least one cover plate 1305. The cover plate 1305 can have a rectangular shape or rectangular cross-section, a rectangular solid shape, a square shape or square cross-section, etc. The cover plate 1305 can be a plastic, material, wood, or ceramic material. For example, the cover plate 1305 can be or include polypropylene, polyethylene, polyvinyl chloride, polystyrene, or any other type of plastic. The cover plate 1305 can include a metal, such as aluminum, steel, or coper. The cover plate 1305 can be removably attached from the storage apparatus 205. For example, the cover plate 1305 can couple with the storage apparatus 205 to form a top side or complete and enclosure of the storage apparatus 205.

Furthermore, the cover plate 1305 can detach or be removed from the storage apparatus 205 to expose the storage area 305.

The cover plate 1305 can extend between the panels 405. For example, the cover plate 1305 can couple with ends 710 of the panels 405. The cover plate 1305 can extend to or from the panel 210 when the panel 210 is deployed. The cover plate 1305 can couple with an end of the panel 210 opposite an end of the panel 210 coupled with the tailgate 110. The cover plate 1305 can include a locking apparatus 1310. The locking apparatus 1310 can be an L-shaped protrusion including a first member extend downward from a bottom surface of the cover plate 1305 and a second member that extends from an end of the first member towards the panel 210. The locking apparatus 1310 can lock with the panel 210 to secure the cover plate 1305 to the storage apparatus 205.

A first end of the cover plate 1305 can be coupled with an end of the panel 210. For example, the bottom surface of the cover plate 1305 can rest on or over a top end or free end of the panel 210 that rotates when the panel 210 is deployed. The first end of the cover plate 1305 can be fixed or coupled to the end of the panel 210 via the locking apparatus 1310. A second end of the cover plate 1305 opposite the first end can be coupled or connected with the hatch 115. The cover plate 1305 can rest, sit, couple, or touch the upper ends of the panels 405 and 210. In this regard, the bottom surface of the cover plate 1305 can touch or couple with the upper ends of the panels 405 and 210. The hatch 115 can touch, couple, or connect with an upper surface of the plate 1305. An end or free end of the hatch 115 can exert a force on the upper surface of the plate 1305. For example, the hatch 115 can exert a force on the second end of the plate 1305 or an upper surface of the plate 1305. The hatch 115, when locked into a closed position, can lock or fix the cover plate 1305 to the storage apparatus 205. Together, the hatch 115 and the locking apparatus 1310 can fix or lock the cover plate 1305 to the storage apparatus 205. Together, the hatch 115 and the locking apparatus 1310 can prevent or stop the cover plate 1305 from being removed. To remove the cover plate 1305, a user may need to unlock and raise the hatch 115. To remove the cover plate 1305, a user may need to unlock the locking apparatus 1310. To remove the cover plate 1305, a user may need to perform both unlocking and raising the hatch 115 and unlocking the locking apparatus 1310.

Referring now to FIGS. 14-21, among others, an example vehicle 105 including a roller apparatus 1405 that unrolls a sheet of fabric 1410 to form the storage area 310 is shown. The vehicle 105 or the storage apparatus 205 can include at least one roller apparatus 1405. For example, a first roller apparatus 1405 can be disposed within the vehicle 105 on a driver side of the vehicle 105. A second roller apparatus 1405 can be disposed within the vehicle 105 on a passenger side of the vehicle 105. The first roller apparatus 1405 can be disposed on a wall of a passenger side of the vehicle 105. The first roller apparatus 1405 can be fixed, coupled, or attached to the wall of a trunk of the vehicle 105 or a passenger area of the vehicle 105. The second roller apparatus 1405 can be disposed on a wall of a driver side of the vehicle 105. The second roller apparatus 1405 can be fixed, coupled, or attached to the wall of a trunk of the vehicle 105 or a passenger area of the vehicle 105.

The roller apparatus 1405 can include at least one component such as a spring, elastic component, or piston that retracts the material 1410. For example, the roller apparatus 1405 can exert a force on the material 1410 to cause the material 1410 to roll up or stow. The material 1410 can roll around a pin, cylinder, or other component that rotates around a longitudinal axis. The pin can exert a rotational force on the material 1410 to roll the material 1410 around the pin. A user can exert a force on an end of the material 1410 to unroll the material 1410. Via the force exerted by the user, the pin can rotate against a force of a spring, piston, or elastic material to unwind the material 1410.

The fabric 1410 can be a vinyl, a polypropylene, a mesh material, a woven material, a cotton material, a latex material, or any other material. The fabric 1410 can be flexible and roll around a pin or cylinder. Connectors 1805 can be coupled with ends of the fabric 1410. For example, a first end of the fabric 1410 can be coupled with the roller apparatus 1405, such as the pin. The first end of the fabric 1410 can be disposed within the housing 1415. A second end of the fabric 1410 opposite the first end can be free. A user can pull on the fabric 1410 to move the second end of the fabric out of the vehicle 105. The second end of the fabric 1410 can be coupled with a first connector 1805. The connector 1805 can cover at least a portion of the second end of the fabric 1410.

The connector 1805 can include at last one feature 1810. The feature can be a protrusion or tongue that can couple with a slot or groove 1815 of the panel 210. The features 1810 can be molded as part of the connector 1805, or can be coupled with the connector 1806. The features 1810 can extend outwards in a direction parallel with the length of the fabric 1410 to an end. The features 1810 can extend from the end inward, at a right angle towards a center of the tailgate 110. The panel 210 can include slots 1815. The slots 1815 can be or include indentations, openings, rectangular shaped spaces, or cavities. The slots 1815 can include cavities or spaces with one open side. The features 1810 can insert into and latch, lock, or secure into place. The features 1810 and the slots 1815 can secure the fabric 1410 to the panel 210.

Figure 22:
FIG. 22 depicts an example storage compartment that deploys from a vehicle.

Referring now to FIG. 22, among others, an example storage compartment 205 that deploys from a vehicle 105 is shown. The storage compartment 205 can include the panel 210 and the panels 405. The panel 210 and the panels 405 can form the storage area 310. The panel 210 can be coupled with the panel 405 when the storage compartment 205 is stowed within the vehicle 105 or deployed outside the vehicle 105.

The storage compartment 205 can include the panel 210 including a first end 720 and a second end 725. The ends 720 and 725 can be opposite each other, e.g., one end on a driver side of the vehicle 105 and one end on a passenger side of the vehicle 105. The first end 720 of the panel 210 can be coupled with an end 2220 of the panel 405. A first panel 405 can include a first end disposed within the vehicle 105, and a second end 2220 opposite the first end. The second end 2220 can couple with the end 720 of the panel 210. The second end 2220 can extend out of the vehicle 105 with the storage compartment 205 when the storage compartment 205 is deployed. The first end of the first panel 405 can remain within the vehicle 105, even when the storage compartment 205 is deployed. The first panel 405 and the panel 210 can form an angle or can be perpendicular. The angle can be a right angle. The angle can be 85-95 degrees. The angle can be 80-100 degrees. The angle can be less than 80 degrees. The angle can be more than 100 degrees. A second panel 405 can include a first end disposed within the vehicle 105, and a second end 2220 opposite the first end. The second end 2220 can couple with the end 725 of the panel 210. The second end 2220 can extend out of the vehicle 105 with the storage compartment 205 when the storage compartment 205 is deployed. The first end of the second panel 405 can remain within the vehicle 105, even when the storage compartment 205 is deployed. The second panel 405 and the panel 210 can form an angle or can be perpendicular. The angle can be a right angle. The angle can be 85-95 degrees. The angle can be 80-100 degrees. The angle can be less than 80 degrees. The angle can be more than 100 degrees.

The storage compartment 205 can include at least one component to move, slide, transport, or translate the storage compartment from a first position to a second position. In the first position, the storage compartment 205 can be disposed at least partially within the vehicle 105, e.g., within the rear storage area 120. The component can move the storage compartment 205 out of the vehicle 105 to the second position. The second position can be at least partially outside the vehicle 105. The second position can be at least partially over the tailgate 110. An end, edge, or surface of the panel 210 or the panels 405 (e.g., a bottom edge) can rest on or be supported by the upper surface 305 of the tailgate 110. The tailgate 110 can support at least a portion of the weight of the storage compartment 205 or cargo of the storage compartment 205. For example, when the storage compartment 205 is moved to the second position, at least a portion of the weight of the storage compartment 205 or the cargo of the storage compartment 205 can be supported by the tailgate 110.

The component can be a rail or track apparatus. For example, the track apparatus can include one or more rails or brackets coupled with inner walls of the vehicle 105. For example, the rails can be disposed within the rear storage area 120. A first rail can be disposed on a first inner surface of a first wall of the vehicle 105, e.g., on a driver side of the vehicle 105. A second rail can be disposed on a second inner surface of a second wall of the vehicle 105, e.g., on a passenger side of the vehicle 105. The rails can be disposed on, coupled with, or fixed to the inner surfaces of the walls of the vehicle 105.

The panels 405 can include features 2205. The features 2205 can be grooves, slots, members, or protrusions in the panels 405. The features 2205 can be disposed on an outer surface of the panels 405, e.g., on a surface that faces away from an interior of the storage area 310 of the storage compartment 205. The features 2205 can run along at least a portion of the length 415 of the panel 405. Each panel 405 can include one, two, three, or any number of features 2205. The number of features on the panel 405 can correspond with the number of rails disposed in the side of the vehicle 105. For example, in FIG. 22, the panel 405 is shown to include two features. In FIG. 22, the vehicle 105 can include two rails on each side of the vehicle 105 to couple with the two features 2205 of each panel 405.

The features 2205 can couple with the rails disposed within the vehicle 105. The first rail can be coupled with a first panel 405 on a driver side of the vehicle 105. For example, the first rail can be coupled with the first panel 405 via the features 2205 of the first panel 405. The first rail can move, via the coupling between the first rail the first panel 405, the storage compartment 205 from the first position to the second position, and from the second position to the first position. The second rail can be coupled with a second panel 405 on a passenger side of the vehicle 105. For example, the second rail can be coupled with the second panel 405 via the features 2205 of the second panel 405. The second rail can move, via the coupling between the second rail the second panel 405, the storage compartment 205 from the first position to the second position, and from the second position to the first position.

Figure 23:
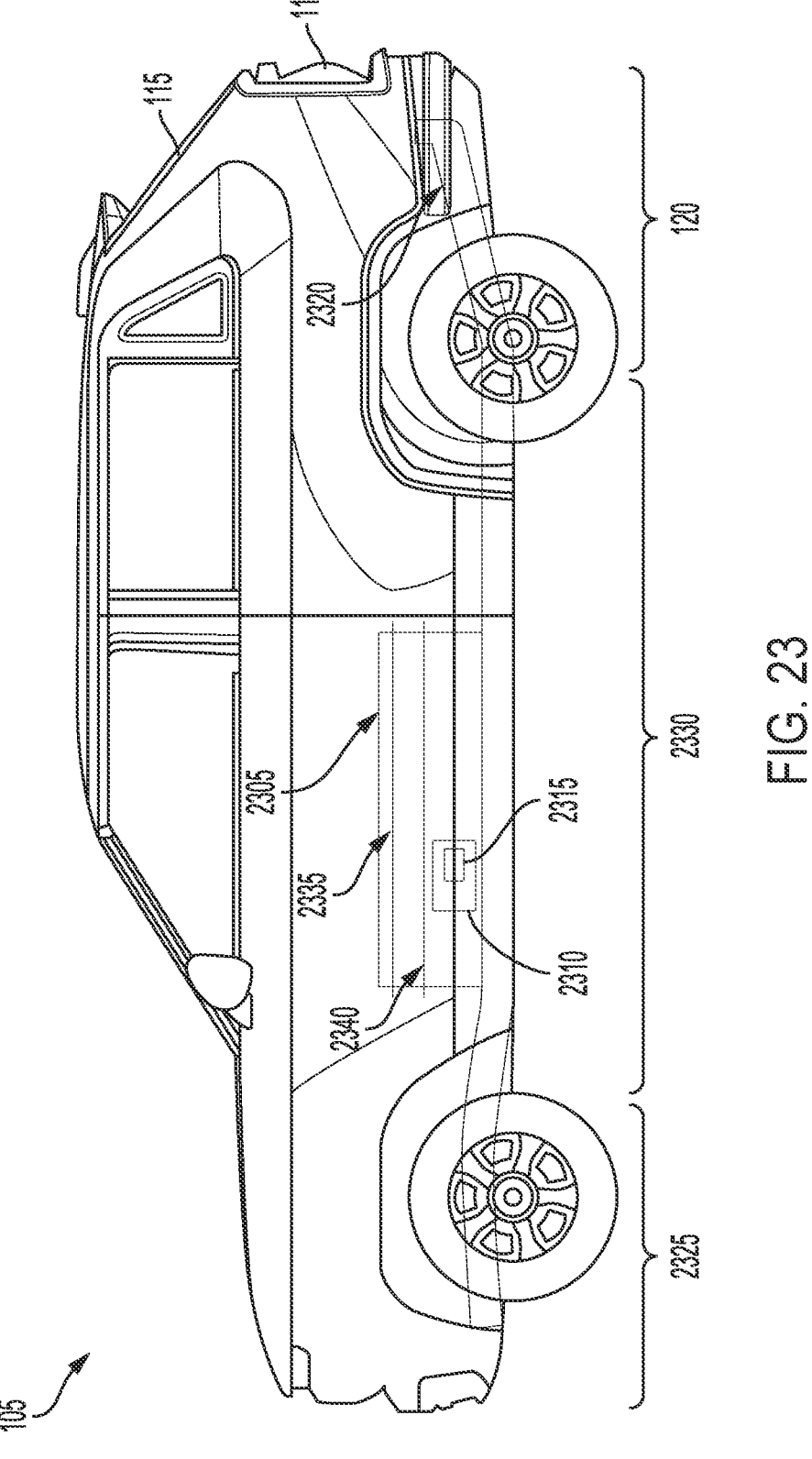
FIG. 23 depicts an example electric vehicle.

FIG. 23 depicts an example cross-sectional view of an electric vehicle 105 installed with at least one battery pack 2305. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 2305 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 2305, batteries 2310 or battery modules 2310, or battery cells 110 to power the electric vehicles.

The electric vehicle 105 can include a chassis 2320 (e.g., a frame, internal frame, or support structure). The chassis 2320 can support various components of the electric vehicle 105. The chassis 2320 can span a front portion 2325 (e.g., a hood or bonnet portion), a body portion 2330, and a rear portion 120 (e.g., a trunk, payload, or boot portion) of the electric vehicle 105. The battery pack 2305 can be installed or placed within the electric vehicle 105. For example, the battery pack 2305 can be installed on the chassis 2320 of the electric vehicle 105 within one or more of the front portion 2325, the body portion 2330, or the rear portion 120. The battery pack 2305 can include or connect with at least one busbar, e.g., a current collector element. For example, the first busbar 2335 and the second busbar 2340 can include electrically conductive material to connect or otherwise electrically couple the battery 2310, the battery modules 2310, or the battery cells 2315 with other electrical components of the electric vehicle 105 to provide electrical power to various systems or components of the electric vehicle 105. The vehicle 105 can include a hatch 115 and a tailgate 110. The storage apparatus 205 can be coupled with the tailgate 2310 and disposed within the rear portion 120.

Figure 24:
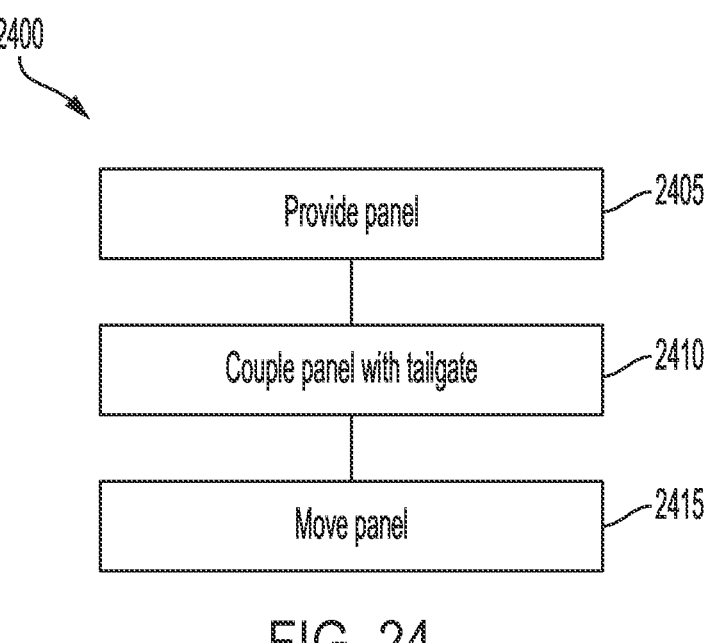
FIG. 24 depicts an example method of a storage apparatus.

Referring now to FIG. 24, among others, an example method 2400 of storage apparatus 205 is shown. The method 2400 can be a method of manufacturing the storage apparatus 205, installing the storage apparatus 205 with a vehicle 105, testing, validating, or performing quality control on the storage apparatus 205. At least a portion of the method 2400 can be performed by an assembly machine or apparatus, a technician, or a user. The method 2400 can include an ACT 2405 of providing a panel. The method 2400 can include an ACT 2410 of coupling a panel with a tailgate. The method 2400 can include an ACT 2415 of moving a panel.

At ACT 2405, the method 2400 can include providing a panel 210. ACT 2405 can include molding, casting, creating, or manufacturing the panel 210. The panel 210 can be manufactured out of a plastic, material, wood, or ceramic material. The panel 210 can be manufactured out of a metal, such as aluminum, steel, or coper. For example, the panel 210 can be manufactured out of polypropylene, polyethylene, polyvinyl chloride, polystyrene, or any other type of plastic. The panel 210 can be manufactured to have a rectangular shape or rectangular cross-section, a rectangular solid shape, a square shape or square cross-section, etc.

At ACT 2410, the method 2400 can include coupling the panel 210 with the tailgate 110. The method 2400 can include coupling the panel 210 with the tailgate 110 so that the panel 210 can move between a first position and a second position. The panel 210 can move from the first position to the second position to from a storage space at least partially outside the vehicle. The method 2400 can include providing a hinge. The method 2400 can include coupling a first end of the hinge with the tailgate 110 and a second end of the hinge with the panel 210. Because the hinge is coupled to both the tailgate 110 and the panel 210, the panel 210 can rotate or move on the hinge between the first and second positions.

The method 2400 can further include providing panels 405. The method 2400 can include providing one panel 405, or two panels 405. The method 2400 can include coupling a first panel 405 with the panel 210. The first panel 405 can be coupled with the panel 210 via at least one hinge. A first end of the hinge can be coupled with the first panel 405, while a second end of the hinge can be coupled with the panel 210. The first panel 405 can deploy from the panel 210 to form the storage space 310. The first panel 405 can move or rotate on the hinge to deploy or retract to a stowed position. The method 2400 can include coupling a second panel 405 with the panel 210. The second panel 405 can be coupled with the panel 210 via at least one second hinge. A first end of the second hinge can be coupled with the second panel 405, while a second end of the second hinge can be coupled with the panel 210. The second panel 405 can deploy from the panel 210 to form the storage space 310. The second panel 405 can move or rotate on the hinge to deploy or retract to a stowed position.

The first and second panels 405 can form outer sides of the storage space 310. The first and second panels 405 can deploy to second positions along the outer sides of the tailgate 110, e.g., an outer side of the tailgate 110 on a driver side of the vehicle 105 and an outer side of the tailgate 110 on a passenger side of the vehicle 105. The method 2400 can include providing a latch 235 and disposing the latch 235 within the vehicle 105. An end or feature of the end of the panel 405 can couple, lock, or attach to the latch 235. A first latch 235 can be disposed on a first side of the vehicle 105 to couple with a first panel 405, while a second latch 235 can be disposed on a second side of the vehicle 105 to couple with the second panel 405.

The method 2400 can include moving the panel 210. The panel 210 can move, rotate, turn, or translate via the hinge coupling the panel 210 to the tailgate 110. The panel 210 can move between a first position where the panel 210 is stowed, to a second position where the panel 210 is deployed. The panel 210 can deploy upwards, where a free end or edge of the panel 210 can rotate about an opposite end of the panel 210 coupled with the tailgate 110. The panel 210 can deploy upwards away from the upper surface 305 of the tailgate 110. Furthermore, the panel 210 can retract or move from the second position to the first position. The panel 210 can rotate about the end coupled with the hinge. The panel 210 can rotate downwards towards the upper surface 305 of the tailgate 110.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

In some implementations, the cargo storage apparatus discussed herein can be applied to other sides of a vehicle besides a rear of a vehicle. For example, the storage apparatus can extend out of a tailgate or opening on a passenger side of a vehicle or a driver side of the vehicle. In some implementations, the cargo storage apparatus can be implemented with or without a tailgate. For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:

a panel to couple with a tailgate of a vehicle, the panel configured to move from a first position relative to the tailgate to a second position to form a storage space at least partially outside the vehicle; and a plate to configured to deploy to a position flush with a surface of the tailgate and extend from a rear end of the vehicle to the tailgate.

2. The apparatus of claim 1, comprising:

a hinge comprising:

a first end to couple with the tailgate; and a second end to couple with the panel;

the hinge to rotate the panel from the first position parallel with the surface of the tailgate to the second position perpendicular to the surface of the tailgate.

3. The apparatus of claim 1, comprising:

a second panel coupled with the panel, the second panel to deploy from the panel to form the storage space at least partially outside the vehicle.

4. The apparatus of claim 1, comprising:

a second panel coupled with the panel, the second panel to rotate from the panel towards the vehicle, the second panel comprising an end to couple with a latch, the latch disposed within an interior of the vehicle.

5. The apparatus of claim 1, comprising:
a second panel; and
a hinge comprising:
 a first end to couple with the panel; and
 a second end to couple with the second panel;
the hinge to move the second panel from the first position parallel with a surface of the second panel to the second position perpendicular to the panel and to the surface of the tailgate.

6. The apparatus of claim 1, comprising:
a second panel coupled with the panel, the second panel to deploy from the panel to form a first side of the storage space along a first outer side of the tailgate; and
a third panel coupled with the panel, the third panel to deploy from the panel to form a second side of the storage space along a second outer side of the tailgate.

7. The apparatus of claim 1, comprising:
the panel comprising a first end and a second end, the first end of the panel coupled with a first end of the tailgate opposite a second end of the tailgate coupled with the vehicle,
the panel to rotate the second end of the panel away from the surface of the tailgate.

8. The apparatus of claim 1, comprising:
a roller apparatus comprising a sheet of fabric, the roller apparatus coupled with an interior of the vehicle,
the roller apparatus to unroll the sheet of fabric, the sheet of fabric comprising an end to couple with the panel.

9. The apparatus of claim 1, comprising:
the tailgate comprising a support member to support the tailgate cantilevered from the rear end of the vehicle;
wherein the plate to is configured to cover the support member.

10. The apparatus of claim 1, comprising:
the tailgate comprising:
 an outer side;
 a top side; and
 a tail light disposed on the outer side and the top side to provide light in a direction orthogonal to the outer side and in a direction orthogonal to the top side.

11. The apparatus of claim 1, comprising:
a second plate comprising:
 a first end to couple with the panel; and
 a second end configured to couple with a rear hatch of the vehicle that is closed.

12. A method, comprising:
providing a panel;
coupling the panel with a tailgate of a vehicle to move between a first position relative to the tailgate and a second position to form a storage space at least partially outside the vehicle; and
coupling a plate to a rear end of the vehicle to deploy to a position flush with a surface of the tailgate and extend from the rear end of the vehicle to the tailgate.

13. The method of claim 12, comprising:
providing a hinge;
coupling a first end of the hinge with the tailgate; and
coupling a second end of the hinge with the panel to move the panel between the first position and the second position.

14. The method of claim 12, comprising:
providing a second panel; and
coupling the second panel with the panel to deploy from the panel to form the storage space at least partially outside the vehicle.

15. The method of claim 12, comprising:
coupling a second panel coupled with the panel to rotate from the panel towards the vehicle;
disposing a latch within an interior of the vehicle that an end of the second panel couples with.

16. The method of claim 12, comprising:
coupling a second panel with the panel to deploy from the panel to form a first side of the storage space along a first outer side of the tailgate; and
coupling a third panel with the panel to deploy from the panel to form a second side of the storage space along a second outer side of the tailgate.

17. An apparatus, comprising:
a storage compartment to couple with a vehicle comprising a tailgate;
a component to move the storage compartment from a first position at least partially within the vehicle to a second position at least partially outside the vehicle over the tailgate; and
a plate to configured to deploy to a position flush with a surface of the tailgate and extend from a rear end of the vehicle to the tailgate.

18. The apparatus of claim 17, the storage compartment comprising:
 a first panel comprising a first end and a second end;
 a second panel comprising a first end and a second end, the first end of the second panel coupled with the first end of the first panel to form a perpendicular angle with the first panel;
 a third panel comprising a first end and a second end, the first end of the third panel coupled with the first end of the first panel to form a perpendicular angle with the first panel.

19. The apparatus of claim 17, comprising:
the storage compartment comprising:
 a first panel comprising a first end and a second end;
 a second panel coupled with the first end of the first panel to form a perpendicular angle with the first panel; and
 a third panel coupled with the second end of the first panel to form a perpendicular angle with the first panel;
a first rail coupled with the second panel to move the storage compartment from the first position to the second position; and
a second rail coupled with the third panel to move the storage compartment from the first position to the second position.

20. The apparatus of claim 17, wherein:
at least a portion of the storage compartment is supported by the tailgate in the second position.

* * * * *